United States Patent
Hsieh et al.

(10) Patent No.: US 10,488,989 B2
(45) Date of Patent: Nov. 26, 2019

(54) TOUCH INPUT SYSTEM AND TOUCH-POSITION GENERATING DEVICE AND METHOD THEREOF

(71) Applicant: Wistron Corporation, New Taipei (TW)

(72) Inventors: Chia-Ta Hsieh, New Taipei (TW); Yu-Yen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 855 days.

(21) Appl. No.: 14/834,415

(22) Filed: Aug. 24, 2015

(65) Prior Publication Data
US 2016/0070419 A1     Mar. 10, 2016

(30) Foreign Application Priority Data
Sep. 4, 2014  (TW) .............................. 103130625 A

(51) Int. Cl.
   *G06F 3/033*    (2013.01)
   *G06F 3/042*    (2006.01)
   *G06F 3/0354*   (2013.01)

(52) U.S. Cl.
   CPC ........ *G06F 3/0421* (2013.01); *G06F 3/03545* (2013.01)

(58) Field of Classification Search
   None
   See application file for complete search history.

(56) References Cited

U.S. PATENT DOCUMENTS

| | | | |
|---|---|---|---|
| 2010/0117992 A1 | 5/2010 | Lin | |
| 2011/0148758 A1* | 6/2011 | Hashimoto | ......... G06F 3/03542 345/157 |
| 2012/0331546 A1 | 12/2012 | Falkenburg | |
| 2014/0267944 A1* | 9/2014 | Ikeda | ...................... G06F 3/041 349/12 |

FOREIGN PATENT DOCUMENTS

TW       201019191 A1    5/2010

OTHER PUBLICATIONS

Office action dated Jan. 26, 2016 for the Taiwan application No. 103130625, filing date: Sep. 4, 2014, p. 1 line 13-14, p. 2-3 and p. 4 line 1-19.

* cited by examiner

Primary Examiner — Carl Adams
(74) *Attorney, Agent, or Firm* — Winston Hsu

(57) ABSTRACT

A touch input system includes a touch surface, a reflective structure, and a touch-position generating device. The reflective structure is disposed to surround the touch surface and protrude out the touch surface. The touch-position generating device includes a pen-like body, a lighting and receiving module disposed in the pen-like body, and a processing module. The lighting and receiving module and the processing module are connected in communication. When the touch input system is in operation, the lighting and receiving module emits light toward the reflective structure and receives the light that is reflected by the reflective structure relative to the touch surface. Then, the processing module determines a touch position of the pen-like body on the touch surface according to the received light. Thereby, the touch-position generating device can perform the determination of the touch position independently from the operation of a touch panel or device providing the touch surface.

14 Claims, 15 Drawing Sheets

TOUCH INPUT SYSTEM AND TOUCH-POSITION GENERATING DEVICE AND METHOD THEREOF

BACKGROUND OF THE INVENTION

1. Field of the Invention

The invention relates to a touch input system and a touch-position generating device and a method therefor, and especially relates to a touch input system, for performing a touch operation with a touch-position generating device, and a touch-position generating device and a method therefor.

2. Description of the Prior Art

Current touch technologies can be classified into two categories. One is to use a device having a touch surface to determine a touch position thereon. The other one is to use a touch pen to offer information of a touch operation performed by the touch pen to other device for use. Capacitive and resistive touch technologies are classified into the former category and most optical touch technologies are classified as well. For the latter category, the touch pen can offer touch information such as a movement distance relative to the touch surface, but the touch pen cannot determine the touch position on the touch surface only according to such partial touch information. In practice, other device, usually the device providing the touch surface, is needed to determine the actual touch position according to the touch information and other auxiliary information. In other words, in the former category, the touch function is achieved by the device providing the touch surface; in the latter category, the touch function is achieved by the coordination of the touch pen and the device providing the touch surface. Therefore, the current touch technologies need the device providing the touch surface, leading to a lack of flexibility of design and usage.

SUMMARY OF THE INVENTION

An objective of the invention is to provide a method for determining a touch position of a touch-position generating device on a touch surface. The method can determine the touch position independently from a device providing the touch surface, which effectively solves the problem of the lack of flexibility of design and usage for the current touch technologies.

The method of the invention is used for determining a touch position of a touch-position generating device on a touch surface. A reflective structure is disposed to surround the touch surface. The method includes using the touch-position generating device to emit light toward the reflective structure, using the touch-position generating device to receive the light that is reflected by the reflective structure, and determining the touch position according to the received light. Thereby, the method can use the touch-position generating device to determine the touch position independently from the device providing the touch surface; in other words, the method can use the touch-position generating device to perform touch function to various touch surfaces (e.g. display screen, projection screen and so on).

Another objective of the invention is to provide a touch input system, which the method of the invention is applied to so that the touch input system can provide a mechanism of determining a touch position independently from a device providing a touch surface therefor. Therefore, the touch input system can effectively solve the problem of the lack of flexibility of design and usage for the current touch technologies as well.

The touch input system of the invention includes a touch surface, a reflective structure, a touch-position generating device, and a processing module. The reflective structure is disposed to surround the touch surface. The touch-position generating device includes a pen-like body and a lighting and receiving module. The pen-like body is used for performing a touch operation on the touch surface. The lighting and receiving module is disposed on the pen-like body. The lighting and receiving module is used for emitting light toward the reflective structure and receiving the light that is normally reflected by the reflective structure relative to the touch surface. The processing module is connected in communication with the lighting and receiving module. The processing module is used for determining a touch position of the pen-like body on the touch surface according to the received light. Thereby, the touch-position generating device can determine the touch position independently from a device providing the touch surface; in other words, the touch input system can be applied to various touch surfaces (e.g. display screen, projection screen and so on) easily.

Another objective of the invention is to provide a touch-position generating device used for the touch input system of the invention. Therefore, the touch-position generating device can provide a mechanism of determining a touch position independently from a device providing a touch surface therefor and can effectively solve the problem of the lack of flexibility of design and usage for the current touch technologies as well.

The touch-position generating device of the invention is used for a touch input system. The touch input system includes a touch surface and a reflective structure. The reflective structure is disposed to surround the touch surface. The touch-position generating device includes a pen-like body, a lighting and receiving module, and a processing module. The pen-like body is used for performing a touch operation on the touch surface. The lighting and receiving module is disposed on the pen-like body. The lighting and receiving module is used for emitting light toward the reflective structure and receiving the light that is reflected by the reflective structure. The lighting and receiving module produces a plurality of measurement values according to the received light. The processing module is disposed on the pen-like body and connected in communication with the lighting and receiving module. The processing module is used for determining a touch position of the pen-like body on the touch surface according to the plurality of the measurement values. Similarly, the touch-position generating device can determine the touch position independently from a device providing the touch surface; in other words, under the existence of the reflective structure, the touch-position generating device can be applied to various touch surfaces (e.g. display screen, projection screen and so on) easily.

Compared to the prior art, the touch-position generating device of the invention obtains position information, e.g. a difference between times for emitting and receiving light, of the touch-position generating device relative to the reflective structure because of the property of the reflective structure, that is disposed to surround the touch surface, reflecting light. Then the touch-position generating device can determine the touch position on the touch surface according to the position information and the relative disposition of the reflective structure to the touch surface without any coordination with a device providing the touch surface. Therefore, the touch input system and the method of the invention can determine the touch position independently from the device providing the touch surface, and can be applied to touch surfaces with various sizes easily, so that the invention can provide more flexible design and usage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
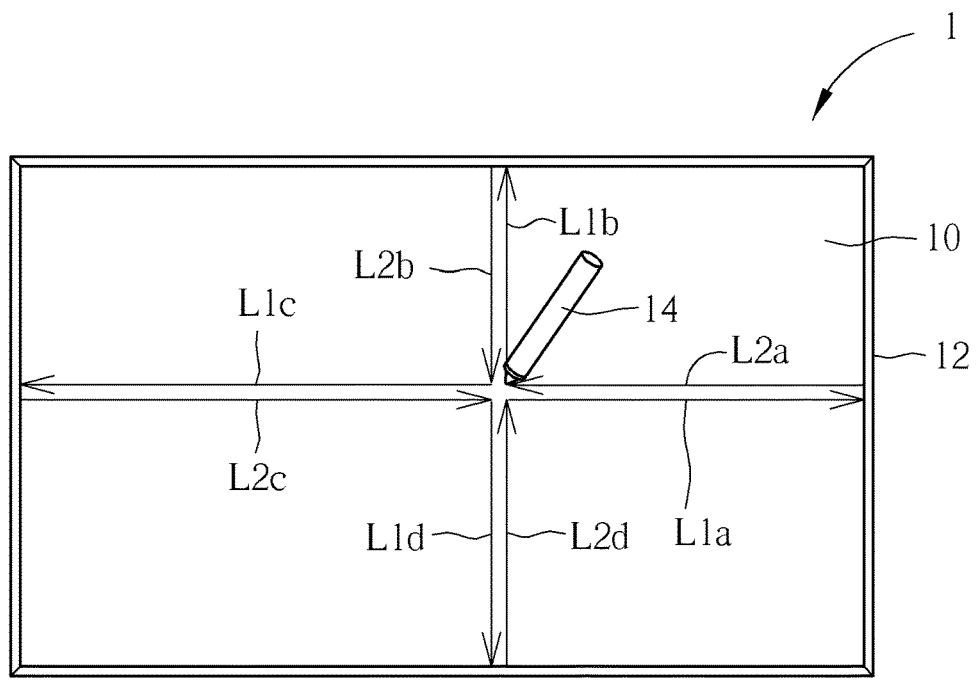
FIG. 1 is a schematic diagram illustrating a touch input system according to the invention.
Figure 2:
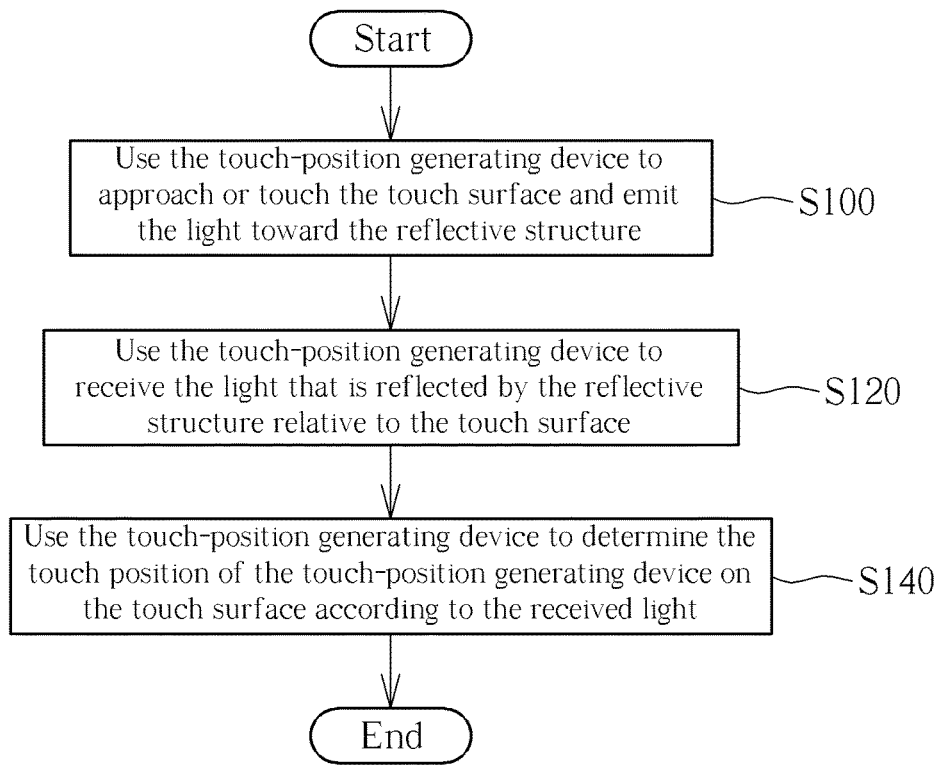
FIG. 2 is a primary flow chart of a method for determining a touch position of the invention.

Please refer to FIG. 1 and FIG. 2. FIG. 1 is a schematic diagram illustrating a touch input system 1 according to the invention. FIG. 2 is a primary flowchart of a method for determining a touch position of the invention. The touch input system 1, which the method is applied to, includes a touch surface 10, a reflective structure 12, and a touch-position generating device 14. The reflective structure 12 is disposed to surround the touch surface 10 and protrude out of the touch surface 10. When the touch input system 1 is in use, according to the method of the invention, a user can use the touch-position generating device 14 to approach or touch the touch surface 10 and emit light (including the light L1a, L1b, L1c and L1d) toward the reflective structure 12, as shown by the step S100. Then the method of the invention is to use the touch-position generating device 14 to receive the light L2a, L2b, L2c and L2d that is reflected by the reflective structure 12 relative to the touch surface 10, as shown by the step S120. Afterwards, the method of the invention is to use the touch-position generating device 14 to determine the touch position on the touch surface 10 (i.e. where the touch-position generating device 14 touch the touch surface 10 or the touch-position generating device 14 is closest to the touch surface 10) according to the received light L2a, L2b, L2c and L2d, as shown by the step S140. Therein, in the step S140, the method of the invention uses the touch-position generating device 14 to determine a plurality of measurement values relative to a plurality of distances from the touch-position generating device 14 to the reflective structure 12 according to the received light L2a, L2b, L2c and L2d, and uses the touch-position generating device 14 to determine the touch position according to the plurality of the measurement values. For practice convenience, the measurement value usually is a time interval that, in principle, is the time for light to travel from the touch-position generating device 14 to the reflective structure 12, to be received by the reflective structure 12, and to travel to the touch-position generating device 14. The time interval reflects the path length the light travels, i.e. twice as long as the distance between the touch-position generating device 14 and the reflective structure 12 (or the portion of the reflective structure 12 by which the light is reflected); however, the invention is not limited thereto. For example, based on the output format of a measurement device (e.g. outputting a distance), the method of the invention can directly take distances as measurement values and determine the touch position according to the distances.

Furthermore, in principle, the invention is practicable, as long as light emitted by the touch-position generating device 14 can be reflected by the reflective structure 12 and be received by the touch-position generating device 14. Therefore, the invention is not limited to the case that the touch-position generating device 14 really touches the touch surface 10 for a touch operation. In practice, a touch feeling for the user can be enhanced by the disposition of the reflective structure 12, for example, by controlling the height in which the reflective structure 12 protrudes out of the touch surface 10, such that the touch-position generating device 14 contacts the touch surface 10 when the reflective structure 12 reflects the light emitted by the touch-position generating device 14. In addition, for a simple interpretation of the mechanism of the touch-position generating device 14 determining the touch position according to the received light, the embodiments in the description are based on a condition that the light is normally reflected substantially (i.e. the light L2a, L2b, L2c and L2d in FIG. 1); however, the invention is not limited thereto.

Figure 3:
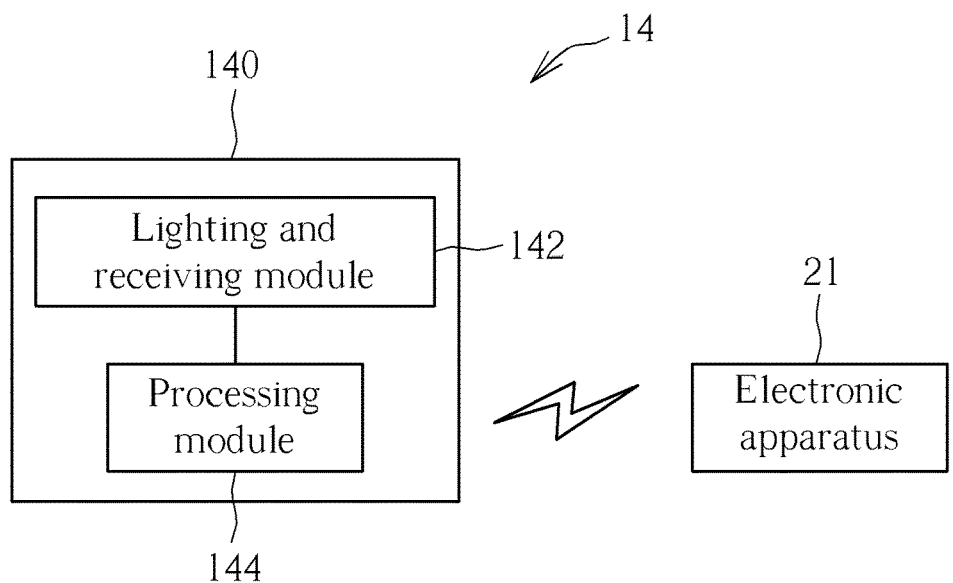
FIG. 3 is a function block diagram of a touch-position generating device of the touch input system in FIG. 1.

Please also refer to FIG. 3. FIG. 3 is a function block diagram of the touch-position generating device 14. In practice, the touch-position generating device 14 includes a pen-like body 140, a lighting and receiving module 142, and a processing module 144. The user can hold the pen-like body 140 to touch the touch surface 10. The lighting and receiving module 142 is disposed on the pen-like body 140. The lighting and receiving module 142 is used for emitting the light (including the light L1a, L1b, L1c and L1d) toward the reflective structure 12 and receiving the light L2a, L2b, L2c and L2d that is normally reflected by the reflective structure 12 relative to touch surface 10. The lighting and receiving module 142 may be exposed out of the pen-like body 140 due to the actual operation mechanism of the lighting and receiving module 142. For example, a light-emitting surface and a light-receiving surface of the lighting and receiving module 142 are exposed out of the pen-like body 140 for emitting light outwards and receiving light smoothly, but the invention is not limited thereto. The processing module 144 is disposed on the pen-like body 140 and connected in communication (i.e. a connection means that can achieve a communication purpose, e.g. connected by a wire or wireless way) with the lighting and receiving module 142. The processing module 144 is used for determining the touch position of the pen-like body 140 on the touch surface 10 according to the received light L1$a$, L1$b$, L1$c$ and L1$d$. Furthermore, in practice, the lighting and receiving module 142 can independently perform a measurement and produce measurement values. The measurement value is relative to a distance from the touch-position generating device 14 to the reflective structure 12. After receiving the measurement values from the lighting and receiving module 142, the processing module 144 determines the touch position according to the received measurement values. In other words, the lighting and receiving module 142 produces a plurality of measurement values according to the received light L2$a$, L2$b$, L2$c$ and L2$d$; the processing module 144 determines the touch position according to the plurality of the measurement values. As described above, the measurement value usually is a time interval, but the invention is not limited thereto.

In practice, after determining the touch position, the touch-position generating device 14 can use the processing module 144 to communicate with an external electronic apparatus 21 (e.g. by a wireless communication) for sending information relative to the touch position to the electronic apparatus 21. For an example, the electronic apparatus 2 is a computer host that controls a displaying device that has a display screen on which the touch surface 10 is provided. The electronic apparatus 21 can control the displaying device to display images, for example, involving a cursor movement, an action of a corresponding object and so on, according to the information relative to the touch position. For another example, the electronic apparatus 21 is a computer host that controls a projector. A screen provided for the projector to project images thereon can be treated as the touch surface 10. The electronic apparatus 21 can control the projector to project images, for example, involving a cursor movement, an action of a corresponding object and so on, according to the information relative to the touch position.

Figure 4:
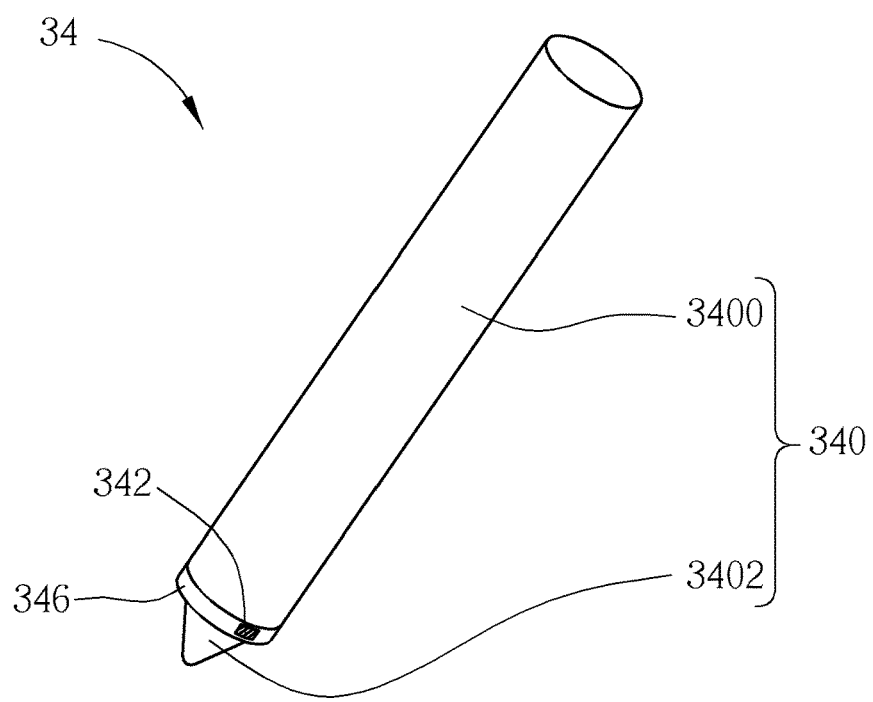
FIG. 4 is a schematic diagram illustrating a touch-position generating device according to a first embodiment
Figure 5:
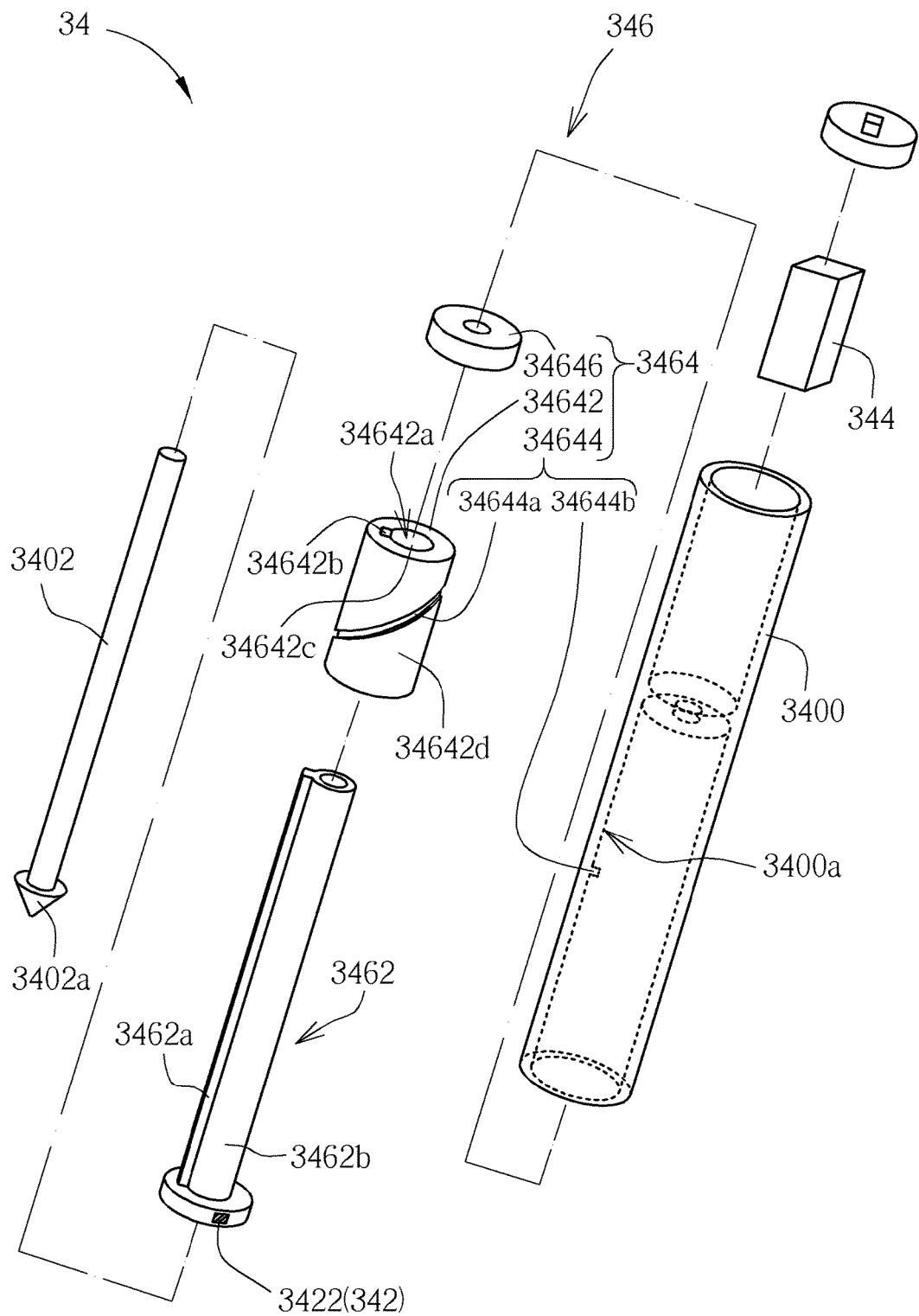
FIG. 5 is an exploded view of the touch-position generating device in FIG. 4.
Figure 6:
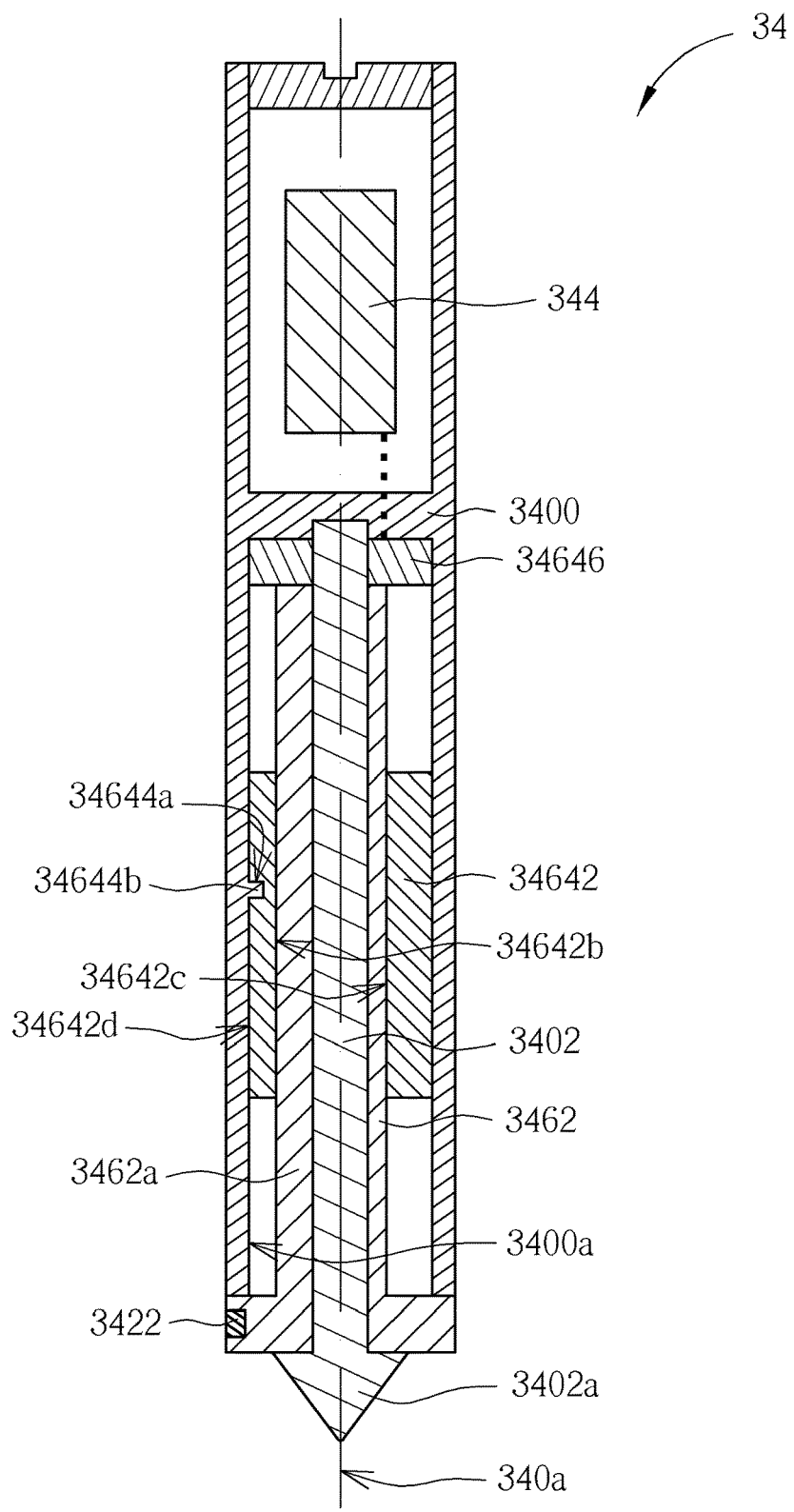
FIG. 6 is a sectional view of the touch-position generating device in FIG. 4.

Please refer to FIGS. 4 to 6. FIG. 4 is a schematic diagram illustrating a touch-position generating device 34 according to a first embodiment. FIG. 5 is an exploded view of the touch-position generating device 34. FIG. 6 is a sectional view of the touch-position generating device 34. The touch-position generating device 34 is logically structurally equal to the touch-position generating device 14. For the descriptions of the components with the same names in the touch-position generating device 34, please refer to the relevant descriptions of the touch-position generating device 14, which will not be repeated in addition. The touch-position generating device 34 includes a pen-like body 340, a lighting and receiving module 342, a processing module 344, and a rotation mechanism 346. The pen-like body 340 includes a tube part 3400 and a rod part 3402. The tube part 3400 forms an accommodating space inside, which accommodates the rotation mechanism 346, the processing module 344, and other components. The rod part 3402 is disposed in the tube part 3400 and fixed relative to the tube part 3400, for example, by being connected directly to an interior structure of the tube part 3400. The rod part 3402 has a contact end 3402$a$ exposed out of the tube part 3400 such that the user can hold the tube part 3400 to touch the touch surface 10 by the contact end 3402$a$. The rotation mechanism 346 is disposed in the pen-like body 340. The rotation mechanism 346 includes a rotation part 3462 and a driving module 3464. The rotation part 3462 is rotatably sleeved on the rod part 3402 and can rotate around the rotation axis 340$a$ (indicated by a chain line in FIG. 6) relative to the pen-like body 340. The driving module 3464 is engaged with the rotation part 3462 and drives the rotation part 3462 to rotate.

In the first embodiment, the driving module 3464 includes a rotation sleeve 34642, a rotation guiding structure 34644, and an electromagnetism generation device 34646. The rotation sleeve 34642 has a through hole 34642$a$. The rotation sleeve 34642 is sleeved on the rotation part 3462 by the through hole 34642$a$. Therein, the cross-sectional profile of the through hole 34642$a$ matches with the cross-sectional profile of the rotation part 3462 such that the rotation part 3462 and the rotation sleeve 34642 can rotate together relative to the rod part 3402 and the rotation sleeve 34642 can slide on the rotation part 3462 along the rotation axis 340$a$; for example, the through hole 34642$a$ and the rotation part 3462 have special cross-sectional profiles. In principle, it is practicable that the cross-sectional profiles of the through hole 34642$a$ and the rotation part 3462 are not circular. In the first embodiment, the rotation sleeve 34642 has a sliding slot 34642$b$ formed on an inner sidewall surface 34642$c$ of the through hole 34642$a$. The rotation part 3462 has a sliding rail 3462$a$ disposed on an outer surface 3462$b$ of the rotation part 3462. The sliding slot 34642$b$ is engaged with the sliding rail 3462$a$ such that the rotation part 3462 and the rotation sleeve 34642 can rotate together relative to the rod part 3402 and the rotation sleeve 34642 can slide on the rotation part 3462 along the rotation axis 340$a$. In practice, the sliding slot can be formed on the rotation part 3462 while the sliding rail is formed in the through hole 34642$a$; such disposition also can achieve the purpose of the rotation part 3462 and the rotation sleeve 34642 being capable of rotating together relative to the rod part 3402. However, the invention is not limited thereto.

The rotation guiding structure 34644 is disposed in the tube part 3400 and includes a helical groove 34644$a$ and a guiding post 34644$b$ which are correspondingly disposed on an outer surface 34642$d$ of the rotation sleeve 34642 and an inner sidewall surface 3400$a$ of the tube part 3400 respectively. The guiding post 34644$b$ can relatively slide in the helical groove 34644$a$, so that when the rotation sleeve 34642 moves relative to the tube part 3400 along the rotation axis 340$a$, the rotation sleeve 34642 rotates around the rotation axis 340$a$ relative to the tube part 3400 under the guiding effect due to the interaction of the helical groove 34644$a$ with the guiding post 34644$b$, which induces the rotation of the rotation part 3462. In the first embodiment, the helical groove 34644$a$ is disposed on the outer surface 34642$d$ of the rotation sleeve 34642 while the guiding post 34644$b$ is disposed on the inner sidewall surface 3400$a$ of the tube part 3400. However, in practice, it is practicable that the helical groove 34644$a$ is disposed on the inner sidewall surface 3400$a$ of the tube part 3400 while the guiding post 34644$b$ is disposed on the outer surface 34642$d$ of the rotation sleeve 34642. In this case, the rotation sleeve 34642 rotates around the rotation axis 340$a$ relative to the tube part 3400 when moving along the rotation axis 340$a$.

The electromagnetism generation device 34646 is disposed in the tube part 3400 and can drive the rotation sleeve 34642 by a magnetic force to move along the rotation axis 340$a$. In practice, the electromagnetism generation device 34646 is a device, e.g. an electromagnet, which can produce an induced magnetic field; the rotation sleeve 34642 can be made of magnetic material or material capable of being attracted by a magnet. Thereby, when the electromagnetism generation device 34646 functions, the electromagnetism generation device 34646 attracts the rotation sleeve 34642 to move relative to the tube part 3400 along the rotation axis 340a so that the rotation sleeve 34642 also rotates around the rotation axis 340a relative to the tube part 3400 under the guiding effect due to the interaction of the helical groove 34644a with the guiding post 34644b. Based on this configuration, from the viewpoint that the user holds the pen-like body 340 (or the tube part 3400), the electromagnetism generation device 34646 is located above the rotation sleeve 34642, so the rotation sleeve 34642 can move upward to approach the electromagnetism generation device 34646 under the induced magnetic field by the electromagnetism generation device 34646 and can fall down due to its weight. However, the invention is not limited thereto. For example, the rotation sleeve 34642 can be made of magnetic material or provided with a permanent magnet thereon so as to produce a permanent magnetic field, so that the electromagnetism generation device 34646 can control the rotation sleeve 34642 to move forwards (or upwards) and backwards (or downwards) under the interaction of the induced magnetic field with the permanent magnetic field. A magnetic force induced between the electromagnetism generation device 34646 and the rotation sleeve 34642 can be changed to be attractive or repulsive for example by controlling the direction of an electric current flowing through the electromagnetism generation device 34646. Therein, a repulsive magnetic force can increase the speed at which the rotation sleeve 34642 moves downwards.

The lighting and receiving module 342 includes a rangefinder 3422 (shown by a block with hatching in FIGS. 4 to 6) disposed on the rotation part 3462 of the rotation mechanism 346 such that when the rotation part 3462 rotates, the rangefinder 3422 also rotates relative to the pen-like body 340 (or the tube part 3400) for emitting light toward all sides. In practice, the rangefinder 3422 can be but not limited to a laser rangefinder. In the first embodiment, the rangefinder 3422 is fixed on a portion of the rotation part 3462 (i.e. the disk part at the lower end of the rotation part 3462) exposed out of the tube part 3400, so the light-emitting surface of the rangefinder 3422 is exposed out of the tube part 3400; however, the invention is not limited thereto. The processing module 344 is disposed in the tube part 3400. For a simple interpretation, in the first embodiment, the processing module 344 also controls and supplies power (by a battery) to the touch-position generating device 34, so the processing module 344 is electrically connected to the electromagnetism generation device 34646 (as shown by bold dashed line in FIG. 6) for controlling the rotation mechanism 346. The processing module 344 and the rangefinder 3422 are connected in wireless communication so that the processing module 344 can receive outputs relative to measurement values from the rangefinder 3422, which is conducive to the rangefinder 3422 rotating with the rotation part 3462. In addition, the rangefinder 3422 can be provided with an independent power source, together with the rangefinder 3422, disposed on the disk part at the lower end of the rotation part 3462.

It is added that in the first embodiment, the lighting and receiving module 342 uses only one rangefinder 3422, so the rotation sleeve 34642 needs to rotate at least one turn (i.e. 360 degrees) so that the lighting and receiving module 342 can emit light toward all sides. In practice, the lighting and receiving module 342 can include a plurality of rangefinders 3422, e.g. four rangefinders 3422, disposed uniformly (or disposed in equal circumferential angles). In this case, the rotation sleeve 34642 needs to rotate just one-fourth turn (i.e. 90 degrees) for the lighting and receiving module 342 to emit light toward all sides. Turns or angles for the rotation sleeve 34642 to be allowed to rotate depend on a distance for the rotation sleeve 34642 to be allowed to move in the tube part 3400 along the rotation axis 340a and a lead of the helical groove 34644a formed on the rotation sleeve 34642.

Figure 7:
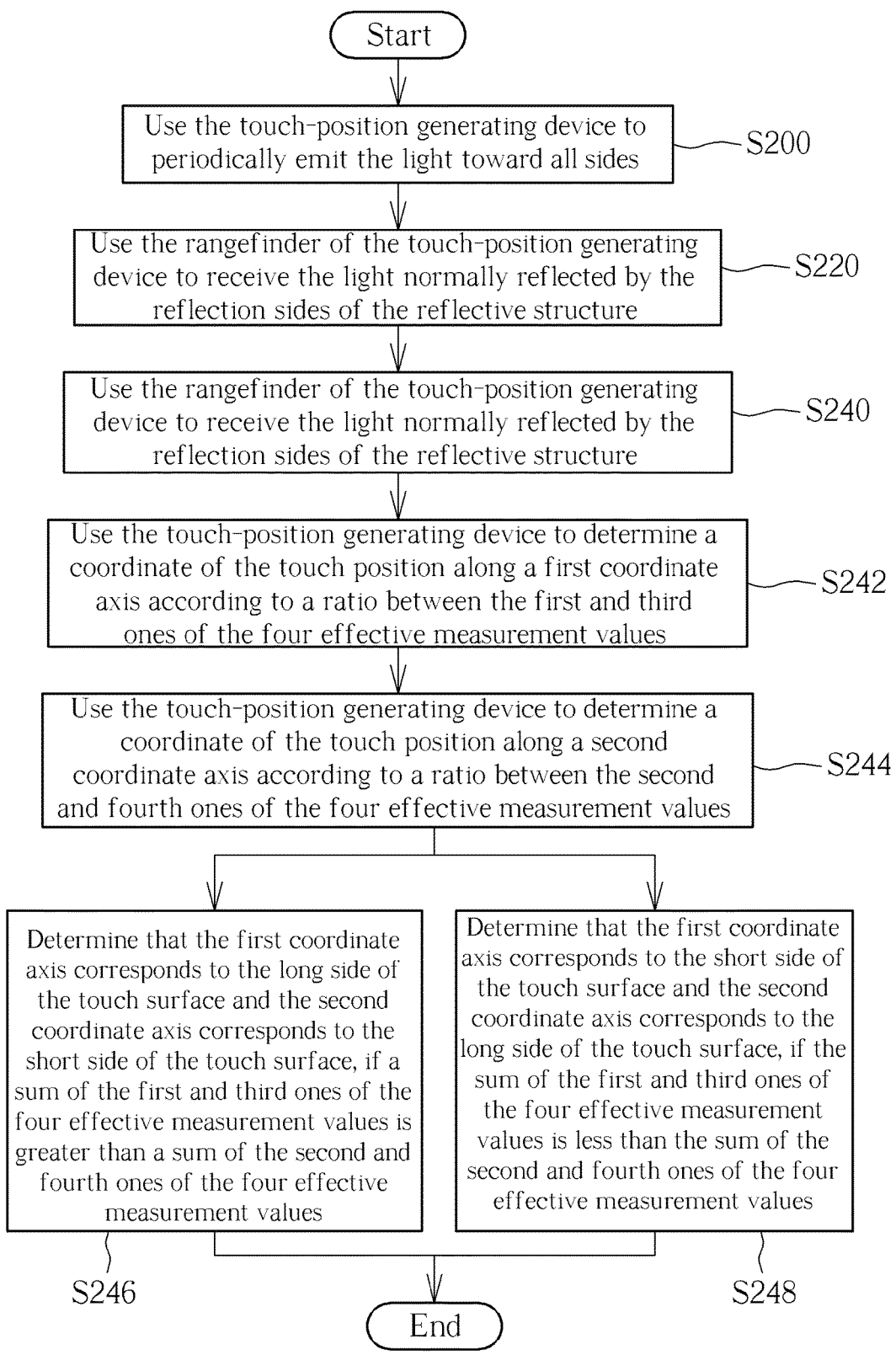
FIG. 7 is a flow chart of a method of a second embodiment according to the invention.
Figure 8:
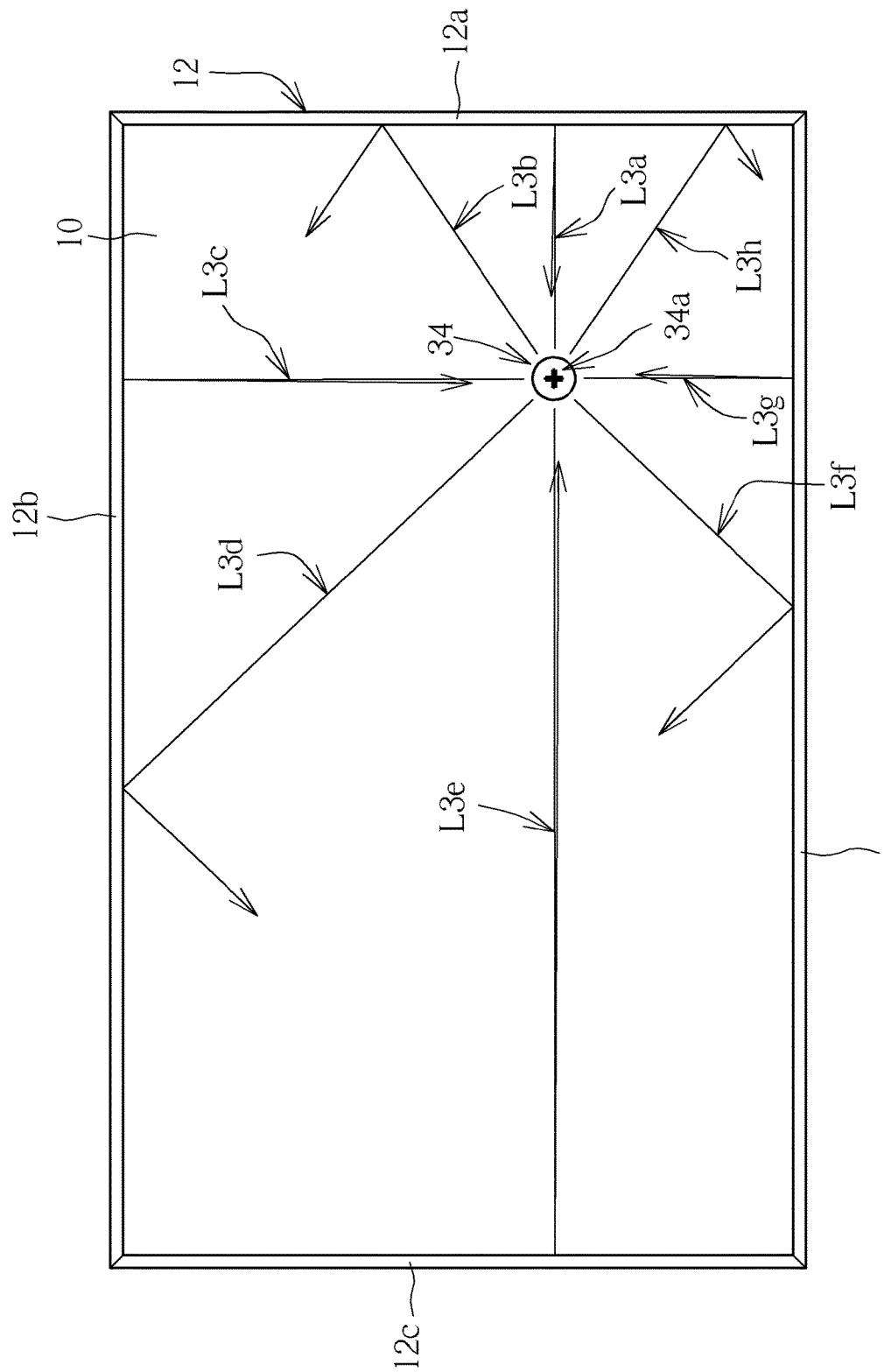
FIG. 8 is a schematic diagram illustrating the touch-position generating device from a top view in accordance with the method shown by FIG. 7.

Please refer to FIG. 7 and FIG. 8. FIG. 7 is a flow chart of a method of a second embodiment according to the invention. The flow chart in FIG. 7 is applied to the touch-position generating device 34 and is still based on the flowchart in FIG. 2. FIG. 8 is a schematic diagram illustrating the touch-position generating device 34 in accordance with the method from a top view; therein, the touch-position generating device 34, shown by a circle, is used in cooperation with the reflective structure 12 and the touch surface 10, and a touch position 34a of the touch-position generating device 34 on the touch surface 10 is indicated by a cross mark. In the second embodiment, the touch surface 10 is rectangular. The reflective structure 12 includes four reflection sides 12a~d for reflecting light. The reflection sides 12a~d are correspondingly disposed at a circumference of the touch surface 10. Corresponding to the step S100 in FIG. 2, in the second embodiment, the method of the invention is to use the touch-position generating device 34 to periodically emit the light toward all sides, as shown by the step S200 in FIG. 7. In practice, in the step S200, the method of the invention can achieve the purpose of rotating the rangefinder 3422 for emitting light L3a~h toward the reflective structure 12 by the rotation of the rotation part 3462 relative to the pen-like body 340 (or the tube part 3400). That is, when rotating, the rangefinder 3422 emits light toward the surrounding of the pen-like body 340 (or the tube part 3400). Therein, for a simplified drawing, there are only a few light beams shown in FIG. 8 for example. In logic, in the step S200, the touch-position generating device 34 uses the lighting and receiving module 342 to scan the surrounding (i.e. 360 degrees).

Corresponding to the step S120 in FIG. 2, in the second embodiment, the method of the invention is to use the rangefinder 3422 of the touch-position generating device 34 to receive the light L3a, L3c, L3e and L3g that is normally reflected by the reflection sides 12a~d of the reflective structure 12 respectively, as shown by the step S220 in FIG. 7. Therein, because of not being normally reflected by the reflection sides 12a~d, the light L3b, L3d, L3f and L3h are not received by the rangefinder 3422. Thereby, by the rangefinder 3422 receiving the light L3a, L3c, L3e and L3g that is normally reflected by the reflection sides 12a~d of the reflective structure 12, the method of the invention can determine the distances from the touch-position generating device 34 (or precisely the rangefinder 3422) to each of the reflection sides 12a~d (or precisely the places where the reflection sides 12a~d reflect the light L3a, L3c, L3e and L3g). It is added that in principle, the term "normally reflected" means that the incident light and the reflected light are parallel (i.e. the included angle between the incident light and the reflected light being zero), but in practice, due to the measurement mechanism of the rangefinder 3422, a quite small included angle is allowable. The quite small included angle can be regarded as being zero under the scale of the whole touch surface 10, so the quite small included angle still meets the requirement of being normally reflected in logic. In other words, the term "normally reflected" means being substantially normally reflected. Therefore, that an included angle between the incident light and the reflected light is less than a tolerance still meets the requirement of being normally reflected in logic.

Corresponding to the step S140 in FIG. 2, in the second embodiment, the method of the invention is to use the touch-position generating device 34 to serially determine four effective measurement values relative to the light L3a, L3c, L3e and L3g, that is emitted from the rangefinder 3422 and is normally reflected to be received by the rangefinder 3422, according to the received light L3a, L3c, L3e and L3g, as shown by the step S240 in FIG. 7. In principle, the four effective measurement values correspond to the distances from the rangefinder 3422 to the reflection sides 12a~d respectively, so the processing module 344 can determine the touch position 34a according to the four effective measurement values. In the second embodiment, the method of the invention is then to use the touch-position generating device 34 to determine a coordinate of the touch position 34a along a first coordinate axis C1 according to a ratio between the first effective measurement value and the third effective measurement value of the four effective measurement values, as shown by the step S242 in FIG. 7; besides, the method is also to use the touch-position generating device 34 to determine a coordinate of the touch position 34a along a second coordinate axis C2 according to a ratio between the second effective measurement value and the fourth effective measurement value of the four effective measurement values, as shown by the step S244 in FIG. 7. Thereby, the touch position 34a is determined by the coordinates corresponding to the first coordinate axis C1 and the second coordinate axis C2.

Furthermore, in the second embodiment, the first effective measurement value and the third effective measurement value correspond to the light L3a and the light L3e normally reflected by the rangefinder 3422 respectively, and the second effective measurement value and the fourth effective measurement value correspond to the light L3c and the light L3g normally reflected by the rangefinder 3422 respectively. The light L3a and L3e are the light travelling in a direction parallel to the long side of the touch surface 10, and the light L3c and L3g are the light travelling in a direction parallel to the short side of the touch surface 10. Therefore, the first coordinate axis C1 is parallel to the long side of the touch surface 10, and the second coordinate axis C2 is parallel to the short side of the touch surface 10. In practice, although the first effective measurement value may correspond to the short side of the touch surface 10, the method of the invention still can determine the relationship of the first coordinate axis C1 and the second coordinate axis C2 with the long side and the short side of the touch surface 10 according to the relationship between the four effective measurement values. In the second embodiment, the method of the invention is to determine that the first coordinate axis C1 corresponds to the long side of the touch surface 10 and the second coordinate axis C2 corresponds to the short side of the touch surface 10 if a sum of the first and third ones of the four effective measurement values is greater than a sum of the second and fourth ones of the four effective measurement values, as shown by the step S246 in FIG. 7, and to determine that the first coordinate axis C1 corresponds to the short side of the touch surface 10 and the second coordinate axis C2 corresponds to the long side of the touch surface 10 if the sum of the first and third ones of the four effective measurement values is less than the sum of the second and fourth ones of the four effective measurement values, as shown by the step S248 in FIG. 7.

In the step S240, in practice, the four effective measurement values can be determined by checking measured values, produced by the rangefinder 3422, with a check value. In the second embodiment, the method of the invention defines two check values. One of the two check values is determined based on a time the light takes to travel back and forth along a first side of the touch surface 10, and the other one of the two check value is determined based on a time the light takes to travel back and forth along a second side of the touch surface 10. The sum of the first and third ones of the four effective measurement values is equal to one of the two check values, and the sum of the second and fourth ones of the four effective measurement values is equal to the other one of the two check values. For a simple interpretation, in the second embodiment, the long side of the touch surface 10 is assigned to the first side, and the short side of the touch surface 10 is assigned to the second side. Therefore, for the case shown by FIG. 8, the sum of the first and third ones (corresponding to the light L3a and L3e) of the four effective measurement values is equal the check value that corresponds to the long side of the touch surface 10, and the sum of the second and fourth ones (corresponding to the light L3c and L3g) of the four effective measurement values is equal the check value that corresponds to the short side of the touch surface 10.

It is added that in practice, the rangefinder 3422 is not located at the structural center line of the touch-position generating device 34, so the sum of the path lengths the light (i.e. the light L3a and L3e), received by the touch-position generating device 14 corresponding to two opposite sides of the touch surface 10, travels is not exactly equal to but actually slightly less than the length twice the long side of the touch surface 10. Hence, in practice, the above phenomenon needs to be involved in the determination of the above two check values. However, for a simple interpretation, the touch-position generating device 14 still can be regarded as a point in logic where the rangefinder 3422 is located. Under this logic configuration, the two check values are the times the light takes to travel back and forth along the long side and the short side of the touch surface 10 respectively. For the difference between the logic configuration and the actual configuration, a person of ordinary skill in the art can deal with it according to the description of this application, for example, by a modification or compensation of the measurement values, the check values or the coordinates of the touch position. All the embodiments in the description of this application are illustrated based on the logic configuration, which will not be mentioned in addition.

Figure 9:
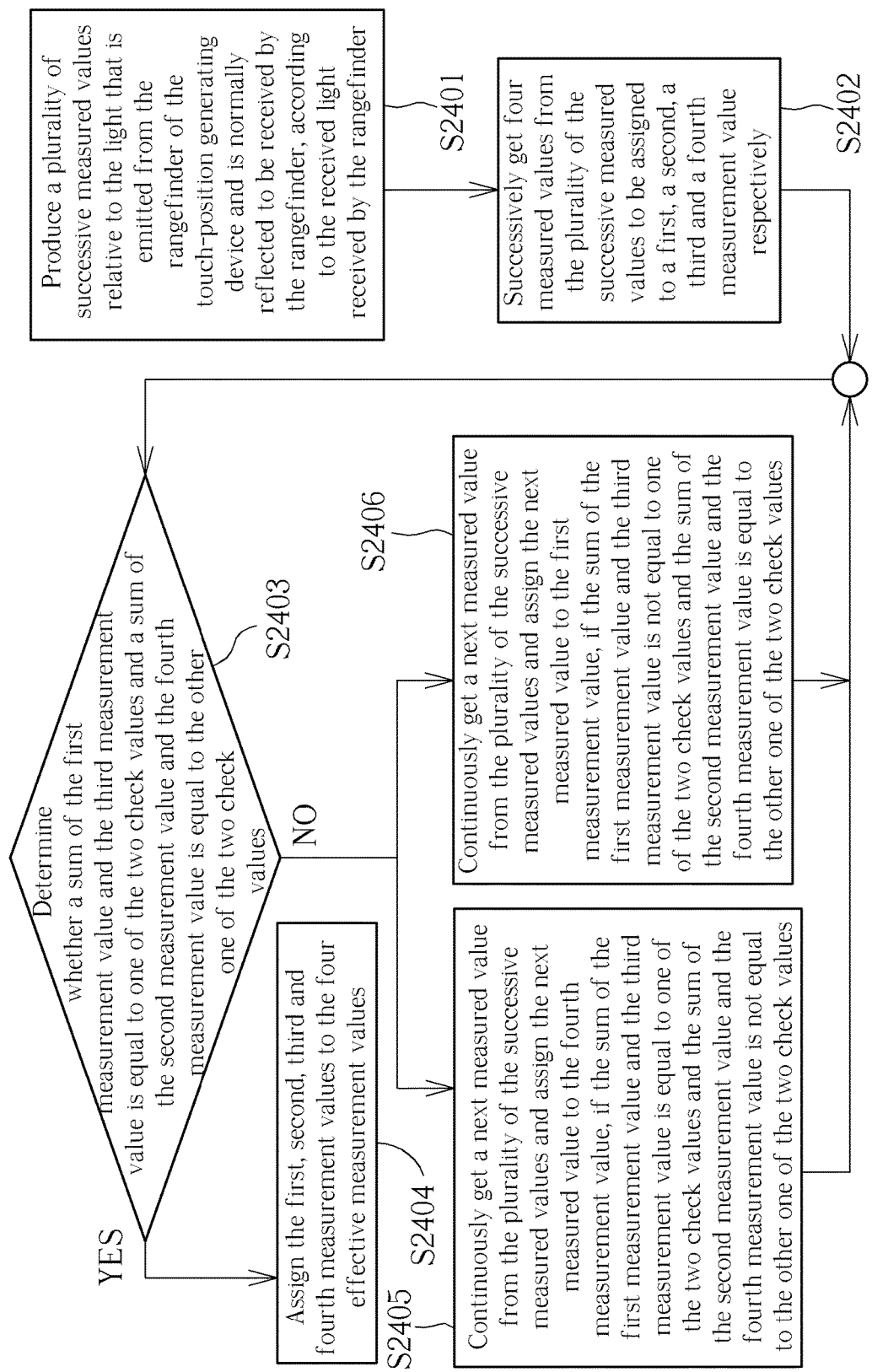
FIG. 9 is a detailed flow chart of the step S240 in FIG. 7 according to an embodiment.

In addition, in an application of the touch-position generating device 14, a series of four measured values produced by the rangefinder 3422 may not exactly correspond to the light L3a, L3c, L3e and L3g normally reflected by the reflection sides 12a~d respectively, leading to a misjudgment on the touch position. For example, after receiving the normally reflected light L3a, L3c and L3e successively, the rangefinder 3422 skips the normally reflected light L3g and receives the normally reflected light L3a again. In this case, the coordinate of the touch position 34a along the second coordinate axis C2 cannot be determined expectably according to the second and fourth measured values (i.e. corresponding to the light L3c and L3a). Therefore, in practice, in the step S240, the method of the invention is to determine the four effective measurement values by selecting the measured values produced by the rangefinder 3422. Please also refer to FIG. 9. FIG. 9 is a detailed flow chart of the step S240 according to an embodiment. The method of the invention is to produce a plurality of successive measured values relative to the light L3a, L3c, L3e and L3g that is emitted from the rangefinder 3422 of the touch-position generating device 34 and is normally reflected to be received by the rangefinder 3422, according to the received light L3a, L3c, L3e and L3g received by the rangefinder 3422, as shown by the step S2401. Therein, the plurality of the successive measured values are greater than a lower threshold and less than an upper threshold. The thresholds can be determined for excluding unexpected measured values, for example, due to multiple reflection, interference by external light, even or internal noise of the device. In practice, the lower threshold can be zero (for example allowing the touch-position generating device 34 to be used close to the reflective structure 12); the upper threshold can be the larger one of the two check values (i.e. the check value corresponding to the long side of the touch surface 10). However, the invention is not limited thereto.

Afterwards, the method of the invention is to successively get four measured values from the plurality of the successive measured values to be assigned to a first, a second, a third and a fourth measurement value respectively, as shown by the step S2402. The method of the invention is to determine whether a sum of the first measurement value and the third measurement value is equal to one of the two check values and a sum of the second measurement value and the fourth measurement value is equal to the other one of the two check values, as shown by the step S2403. If the determination result in the step S2403 is YES, the method of the invention is to assign the first, second, third and fourth measurement values to the four effective measurement values, as shown by the step S2404.

If the determination results in the step S2403 is NO, the method of the invention proceeds according to different situations. If the sum of the first measurement value and the third measurement value is equal to one of the two check values and the sum of the second measurement value and the fourth measurement value is not equal to the other one of the two check values, the method of the invention is to continuously get a next measured value from the plurality of the successive measured values and assign the next measured value to the fourth measurement value, as shown by the step S2405. If the sum of the first measurement value and the third measurement value is not equal to one of the two check values and the sum of the second measurement value and the fourth measurement value is equal to the other one of the two check values, the method of the invention is to continuously get a next measured value from the plurality of the successive measured values and assign the next measured value to the first measurement value, as shown by the step S2406. The flow now returns to the step S2403 to determine whether the updated first, second, third and fourth measurement values meet the requirement for the four effective measurement values.

Figure 10:
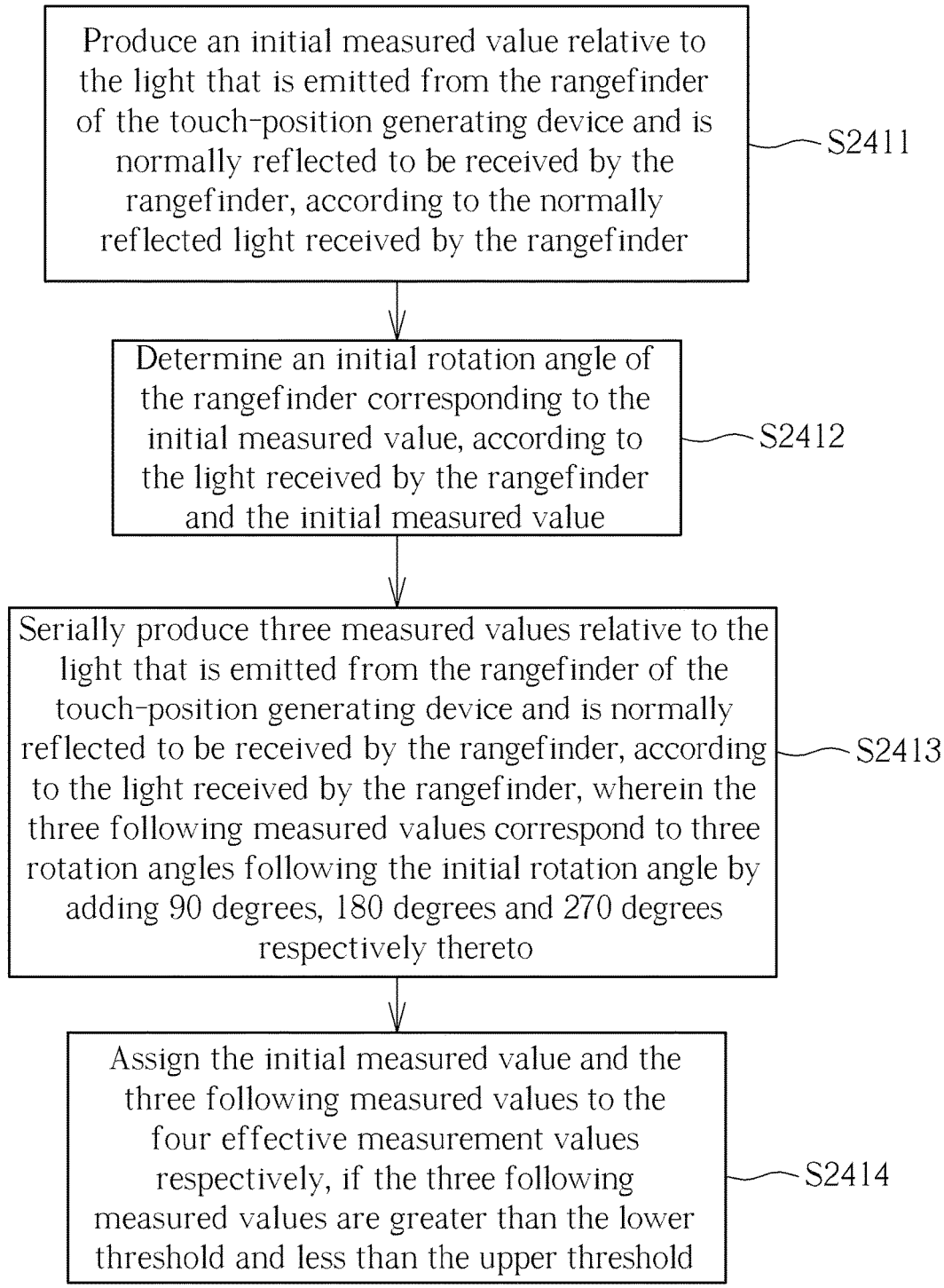
FIG. 10 is a detailed flow chart of the step S240 in FIG. 7 according to another embodiment.

In principle, the effective measurement value is produced by the rangefinder 3422 rotating every 90 degrees, so in practice, the method of the invention can determine the four effective measurement values based on this characteristic. Please also refer to FIG. 10. FIG. 10 is a detailed flow chart of the step S240 according to another embodiment. The method of the invention is to produce an initial measured value relative to the light (e.g. the light L3a) that is emitted from the rangefinder 3422 of the touch-position generating device 34 and is normally reflected to be received by the rangefinder 3422, according to the normally reflected light L3a, L3c, L3e and L3g received by the rangefinder 3422, as shown by the step S2411. Therein, the initial measured value is greater than a lower threshold and less than an upper threshold. The interpretation of the thresholds herein is similar to that of the thresholds in the step S2401 and will not be repeated in addition.

Afterwards, the method of the invention is to determine an initial rotation angle of the rangefinder 3422 corresponding to the initial measured value, according to the light L3a received by the rangefinder 3422 and the initial measured value, as shown by the step S2412. Then the method of the invention is to serially produce three measured values relative to the light L3c, L3e and L3g that is emitted from the rangefinder 3422 of the touch-position generating device 34 and is normally reflected to be received by the rangefinder 3422, according to the light L3a, L3c, L3e and L3g received by the rangefinder 3422, as shown by the step S2413; therein, the three following measured values correspond to three rotation angles following the initial rotation angle by adding 90 degrees, 180 degrees and 270 degrees respectively thereto. If the three following measured values are greater than the lower threshold and less than the upper threshold, the method of the invention is to assign the initial measured value and the three following measured values (i.e. four measured values) to the four effective measurement values respectively, as shown by the step S2414. It is added that in practice, the step S2411 to the step S2414 can be implemented after the rangefinder 3422 produces a plurality of measured values, or be implemented dynamically. For example, once an initial measured value is obtained, the touch-position generating device 34 can process measured values produced by the rangefinder 3422 only when the rangefinder 3422 rotates to 90, 180 and 270 degrees relative to the initial rotation angle.

It is added that in the second embodiment, the method of the invention determines the coordinates by ratios between two opposite effective measurement values (e.g. the first and third effective measurement values, and the second and fourth effective measurement values), but the invention is not limited thereto. For example, the coordinate is determined by ratios between the effective measurement value and the corresponding check value, or by the effective measurement value directly. Furthermore, in the second embodiment, the touch surface 10 is rectangular and the reflective structures 12 includes the four reflection sides 12a~d correspondingly, so in principle, the processing module 344 can determine the four effective measurement values correspondingly; however, the invention is not limited thereto. For example, in an embodiment, the reflective structure 12 may include more or less reflection sides corresponding to the profile of the touch surface, so that the processing module 344 can determine more or less effective measurement values correspondingly and determine the touch position on the touch surface according to these effective measurement values.

In addition, in the second embodiment, the lighting and receiving module 342 of the touch-position generating device 34 uses the single rangefinder 3422 to emit the light L3a~h toward the reflective structure 12 and receive the light L3a, L3c, L3e and L3g normally reflected by the reflective structure 12 relative to the touch surface 10. In practice, the touch-position generating device 34 emits light toward all sides by rotating the rotation part 3462 360 degrees (i.e. a turn). In an embodiment, if the touch-position generating device 34 uses four rangefinders, the rotation part 3462 just needs to rotate 90 degrees (i.e. a quarter turn) so that the touch-position generating device 34 emits light toward all sides, and so on. Furthermore, if four rangefinders are used, in principle, when one of the four rangefinders receives normally reflected light, the other three of the four rangefinders also receive normally reflected light. In such case, four measured value produced by the four rangefinders can be treated as the above-mentioned four effective measurement values directly.

Figure 11:
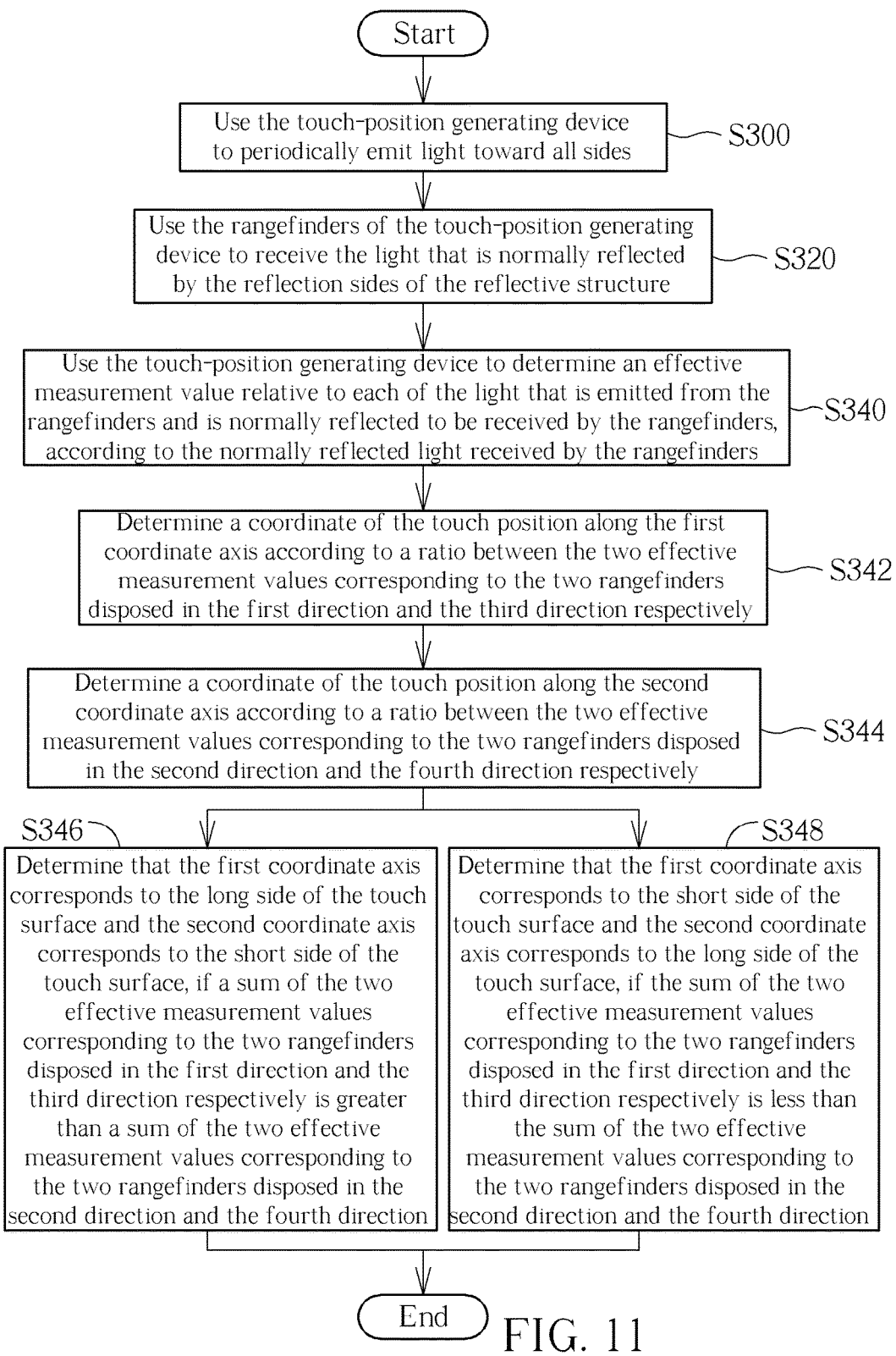
FIG. 11 is a flow chart of a method of a third embodiment according to the invention.
Figure 12:
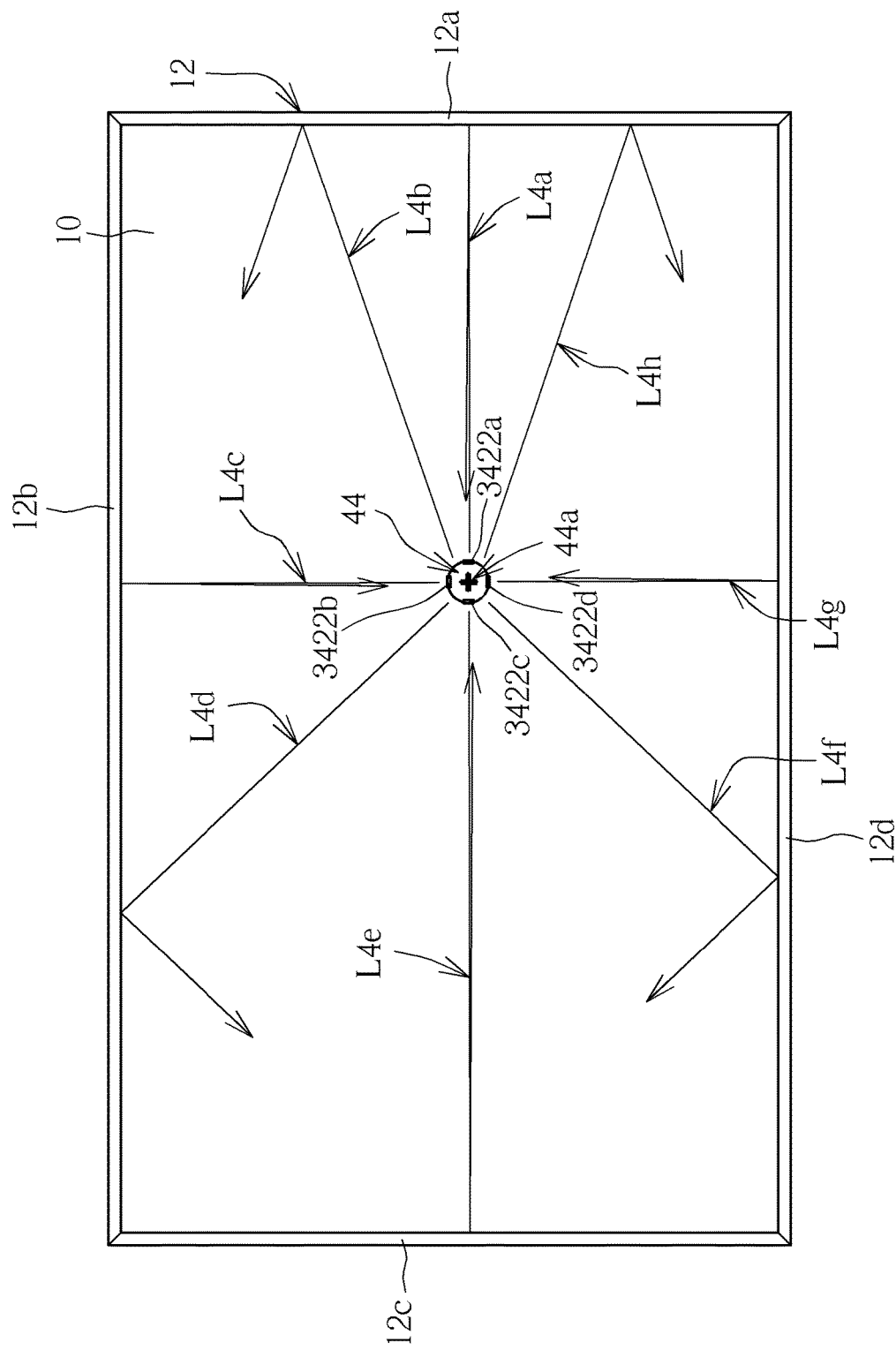
FIG. 12 is a schematic diagram illustrating a touch-position generating device from a top view in accordance with the method shown by FIG. 11.

For more details, please refer to FIG. 11 and FIG. 12. FIG. 11 is a flow chart of a method of a third embodiment according to the invention. The flow chart in FIG. 11 is still based on the flow chart in FIG. 2. FIG. 12 is a schematic diagram illustrating a touch-position generating device 44 in accordance with the method from a top view; therein, the touch-position generating device 44 is used in cooperation with the reflective structure 12 and the touch surface 10 mentioned above. The touch-position generating device 44 and the touch-position generating device 34 are structurally similar. Compared to the touch-position generating device 34, the touch-position generating device 44 uses four rangefinders 3422a~d equally disposed on the rotation part 3462; therefore, for the description of the structure of the touch-position generating device 44, please refer to the relevant description of the touch-position generating device 34, which will not be repeated in addition. In FIG. 12, the touch-position generating device 44 is indicated by a circle. A touch position 44a of the touch-position generating device 44 on the touch surface 10 is indicated by a cross mark in FIG. 12. The four rangefinders 3422a~d of the touch-position generating device 44 are indicated by four rectangles disposed toward all sides at the circumference of the circle in a first, a second, a third and a fourth direction respectively (i.e. the rightward, upward, leftward and downward directions in FIG. 12). The first direction is opposite to the third direction; the second direction is opposite to the fourth direction. Corresponding to the step S100 in FIG. 2, in the third embodiment, the method of the invention is to use the touch-position generating device 44 to periodically emit light toward all sides, as shown by the step S300 in FIG. 11. In practice, in the step S300, the method of the invention can achieve the purpose of rotating the rangefinders 3422a~d for emitting light L4a~h toward the reflective structure 12 by the rotation of the rotation part 3462 relative to the pen-like body 340 (or the tube part 3400). Therein, for a simplified drawing, there are only a few light beams shown in FIG. 12 for example. In logic, in the step S300, the touch-position generating device 44 uses the lighting and receiving module 342 to scan the surrounding; therein, each of the rangefinders 3422a~d simultaneously scans 90 degrees, so that the rangefinders 3422a~d as a whole scan 360 degrees.

Corresponding to the step S120 in FIG. 2, in the third embodiment, the method of the invention is to use the rangefinders 3422a~d of the touch-position generating device 44 to receive the light L4a, L4c, L4e and L4g that is normally reflected by the reflection sides 12a~d of the reflective structure 12, as shown by the step S320 in FIG. 11. Therein, because of not being normally reflected by the reflection sides 12a~d, the light L4b, L4d, L4f and L4h will not be received by the rangefinders 3422a~d. Similarly, the method of the invention can determine the distance of the touch-position generating device 44 to each of the reflection sides 12a~d by the rangefinders 3422a~d receiving the light L4a, L4c, L4e and L4g normally reflected by the reflective structure 12. It is added that in the third embodiment, the rangefinders 3422a~d are disposed in equal circumferential angles, i.e. 90 degrees, so that the rangefinders 3422a~d receive the normally reflected light L4a, L4c, L4e and L4g respectively simultaneously. For other description of the rangefinders 3422a~d receiving light, please refer to the relevant description above, which will not be repeated in addition.

Corresponding to the step S140 in FIG. 2, in the third embodiment, the method of the invention is to use the touch-position generating device 44 to determine an effective measurement value relative to each of the light L4a, L4c, L4e and L4g that is emitted from the rangefinders 3422a~d and is normally reflected to be received by the rangefinders 3422a~d, according to the normally reflected light L4a, L4c, L4e and L4g received by the rangefinders 3422a~d, as shown by the step S340 in FIG. 11. Similarly, the four effective measurement values reflects the distances from the rangefinders 3422a~d to the reflection sides 12a~d respectively, so the processing module 344 can determine the touch position 44a according to the four effective measurement values. In the third embodiment, the method of the invention is then to use the touch-position generating device 44 to determine a coordinate of the touch position 44a along the first coordinate axis C1 according to a ratio between the two effective measurement values corresponding to the two rangefinders 3422a and 3422c disposed in the first direction and the third direction respectively, as shown by the step S342 in FIG. 11; besides, the method is also to use the touch-position generating device 44 to determine a coordinate of the touch position 44a along the second coordinate axis C2 according to a ratio between the two effective measurement values corresponding to the two rangefinders 3422a and 3422c disposed in the second direction and the fourth direction respectively, as shown by the step S344 in FIG. 11. Thereby, the touch position 44a is determined by the coordinates corresponding to the first coordinate axis C1 and the second coordinate axis C2.

Furthermore, in the third embodiment, the light L4a and L4e are the light travelling in a direction parallel to the long side of the touch surface 10, and the light L4c and L4g are the light travelling in a direction parallel to the short side of the touch surface 10. Therefore, the first coordinate axis C1 is parallel to the long side of the touch surface 10, and the second coordinate axis C2 is parallel to the short side of the touch surface 10. In practice, the effective measurement value produced by the rangefinder 3422a corresponds to the short side of the touch surface 10 when the rangefinders 3422a~d receive the normally reflected light L4a, L4c, L4e and L4g; therein, the light L4a is the light traveling the direction parallel to the short side of the touch surface 10. Therefore, the method of the invention can determine the relationship of the first coordinate axis C1 and the second coordinate axis C2 with the long side and the short side of the touch surface 10 according to the relationship between the four effective measurement values. In the third embodiment, the method of the invention is to determine that the first coordinate axis C1 corresponds to the long side of the touch surface 10 and the second coordinate axis C2 corresponds to the short side of the touch surface 10, if a sum of the two effective measurement values corresponding to the two rangefinders 3422a and 3422c disposed in the first direction and the third direction respectively is greater than a sum of the two effective measurement values corresponding to the two rangefinders 3422b and 3422d disposed in the second direction and the fourth direction, as shown by the step S346 in FIG. 11, and to determine that the first coordinate axis C1 corresponds to the short side of the touch surface 10 and the second coordinate axis C2 corresponds to the long side of the touch surface 10, if the sum of the two effective measurement values corresponding to the two rangefinders 3422a and 3422c disposed in the first direction and the third direction respectively is less than the sum of the two effective measurement values corresponding to the two rangefinders 3422*b* and 3422*d* disposed in the second direction and the fourth direction, as shown by the step S348 in FIG. 11.

In the step S340, in practice, the four effective measurement values can be determined by checking measured values, produced by the rangefinders 3422*a~d*, with a check value. In the third embodiment, the method of the invention also defines two check values like the two check values in the abovementioned second embodiment. For the description of the two check values herein, please refer to the relevant description in the foregoing description, which will not be repeated in addition. Similarly, Based on the case shown by FIG. 12, the sum of the two effective measurement values corresponding to the light L3*a* and L3*e* is equal the check value corresponding to the long side of the touch surface 10, and the sum of the two effective measurement values corresponding to the light L3*c* and L3*g* is equal the check value corresponding to the short side of the touch surface 10.

Figure 13:
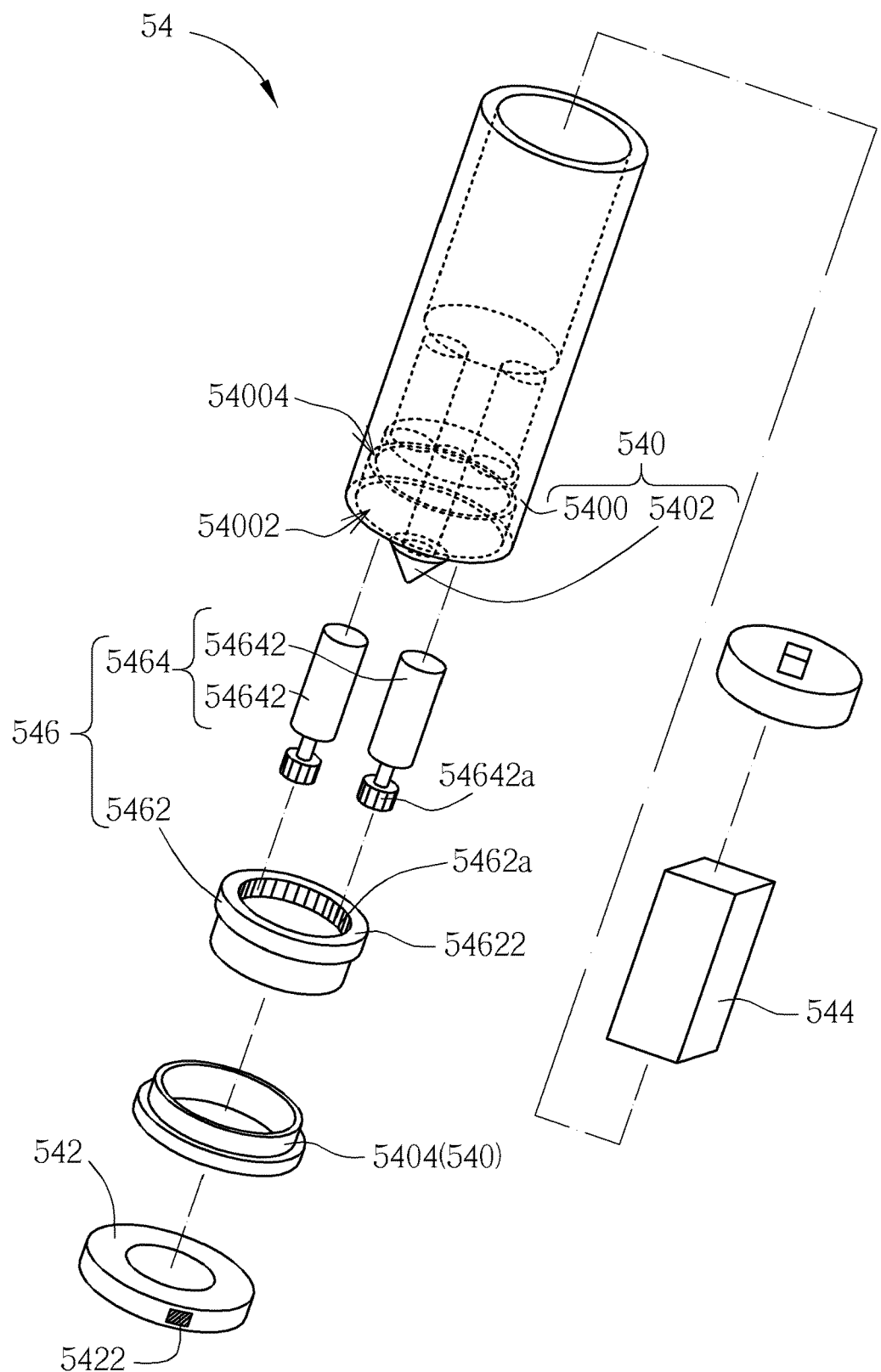
FIG. 13 is an exploded view of a touch-position generating device of a fourth embodiment.
Figure 14:
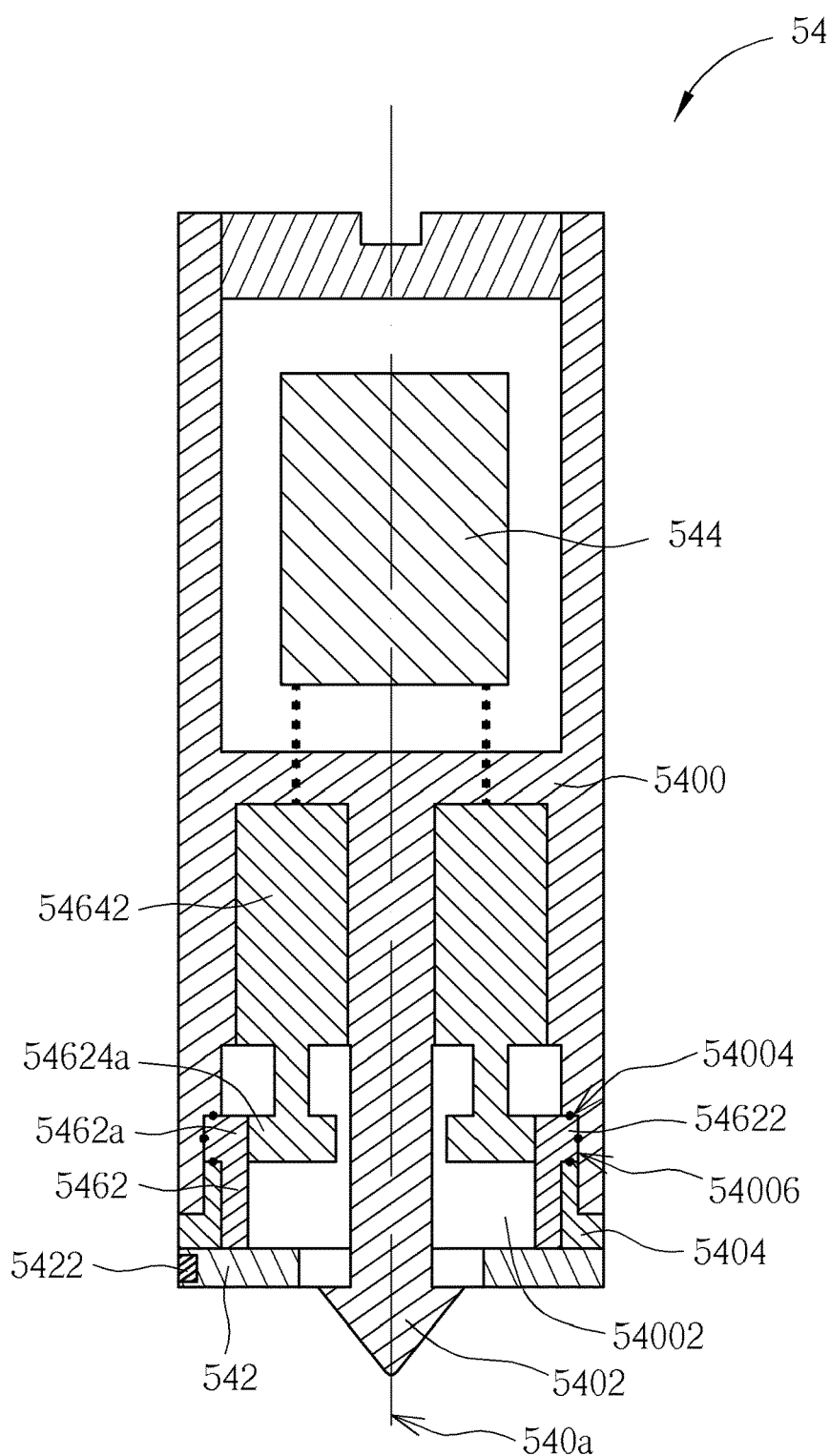
FIG. 14 is a sectional view of the touch-position generating device in FIG. 13.

The above embodiments are based on the fact that the touch-position generating devices 34 and 44 are used as devices for performing touch operation, but the invention is not limited. Please refer to FIG. 13 and FIG. 14. FIG. 13 is an exploded view of a touch-position generating device 54 of a fourth embodiment. FIG. 14 is a sectional view of the touch-position generating device 54. The touch-position generating device 54 includes a pen-like body 540, a lighting and receiving module 542, a processing module 544, and a rotation mechanism 546. The pen-like body 540 includes a main portion 5400 and a contact portion 5402. The contact portion 5402 is fixedly connected to the main portion 5400 and is exposed out of the main portion 5400, such that the user can hold the main portion 5400 and contact the touch surface 10 by the contact portion 5402. The main portion 5400 forms an accommodating space inside for accommodating the rotation mechanism 546, the processing module 544 and so on. The rotation mechanism 546 includes a rotation part 5462 and a driving module 5464. The driving module 5464 is engaged with the rotation part 5462 to drive the rotation part 5462 to rotate. The lighting and receiving module 542 includes at least one rangefinder 5422 (shown by a block with hatching in FIG. 13 and FIG. 14) fixed on the rotation part 5462.

In the fourth embodiment, the rotation part 5462 is rotatably disposed in the main portion 5400 and is rotatable around a rotation axis 540*a* (indicated by a chain line in FIG. 14) relative to the pen-like body 540. The rotation part 5462 includes an internal gear 5462*a*. The driving module 5464 includes at least one motors 54642 (e.g. two motors in the fourth embodiment) disposed in the main portion 5400. Each motor 54642 includes an external gear 54642*a* and drives the rotation part 5462 to rotate relative to the main portion 5400 by the external gear 54642*a* engaging with the internal gear 5462*a*. Therein, for a simplified drawing, in FIG. 14, the motor 54642 is cross sectioned in a single structure; the details of the profiles of the external gear 54642*a* and the internal gear 5462*a* are omitted. In addition, the rotation part 5462 is substantially ring-shaped and includes a flange 54622. The main portion 5400 has an opening 54002 and a step structure 54004 formed at the opening 54002. The contact portion 5402 protrudes out of the main portion 5400 from the opening 54002. The pen-like body 540 further includes a constraint part 5404 fitted in the step structure 54004 such that the constraint part 5404 and the step structure 54004 form a recess 54006. The flange 54622 is rotatably disposed in the recess 54006. In practice, a plurality of rolling balls (shown by small black spots in FIG. 14) can be disposed between the flange 54622 and the recess 54006, so that the rotation part 5462 can rotate more smoothly.

Therefore, the touch-position generating device 54 is logically structurally equal to the touch-position generating device 34. For the descriptions of the components with the same names in the touch-position generating device 54, please refer to the relevant descriptions of the touch-position generating device 34, which will not be repeated in addition. Compared to the touch-position generating device 34, the touch-position generating device 54 has a different rotating mechanism. However, both the rotation parts 3462 and 5462 of the touch-position generating devices 34 and 54 can rotate the rangefinders 3422 and 5422 to emit light toward the surrounding of the touch-position generating devices 34 and 54. Therefore, the lighting and receiving module 542 of the touch-position generating device 54 can include only one rangefinder 5422 or four rangefinder 5422 disposed in four directions (or in equal circumferential angles), so that the touch-position generating device 54 also can replace the touch-position generating devices 34 and 44 to be applied to the flow charts mentioned above.

The above-mentioned embodiments are based on the fact that the touch-position generating devices 34 and 54 are used to periodically emit light toward all sides, but the invention is not limited thereto. Please refer to FIG. 15, which is a side view of a touch-position generating device 64 contacting the touch surface 10 according to a fifth embodiment. The touch-position generating device 64 has a similar structure to the touch-position generating device 14. Compared to the touch-position generating devices 34 and 54, the touch-position generating device 64 does not use any rotation mechanism for emitting light but emits light toward all sides simultaneously. In the fifth embodiment, the touch-position generating device 64 has a pen-like body 640, a lighting and receiving module 642, and a processing module 644 (indicated by a dashed rectangle). The lighting and receiving module 642 and the processing module 644 are disposed on the pen-like body 640. The lighting and receiving module 642 emits light toward all sides simultaneously. For the other description of the touch-position generating device 64, please refer to the relevant description of the touch-position generating device 14, which will not be repeated in addition. Furthermore, in the fifth embodiment, the lighting and receiving module 642 will not rotate relative to the pen-like body 640, so the processing module 644 may be electrically connected to the lighting and receiving module 642 directly; however, the invention is not limited thereto.

Figure 15:
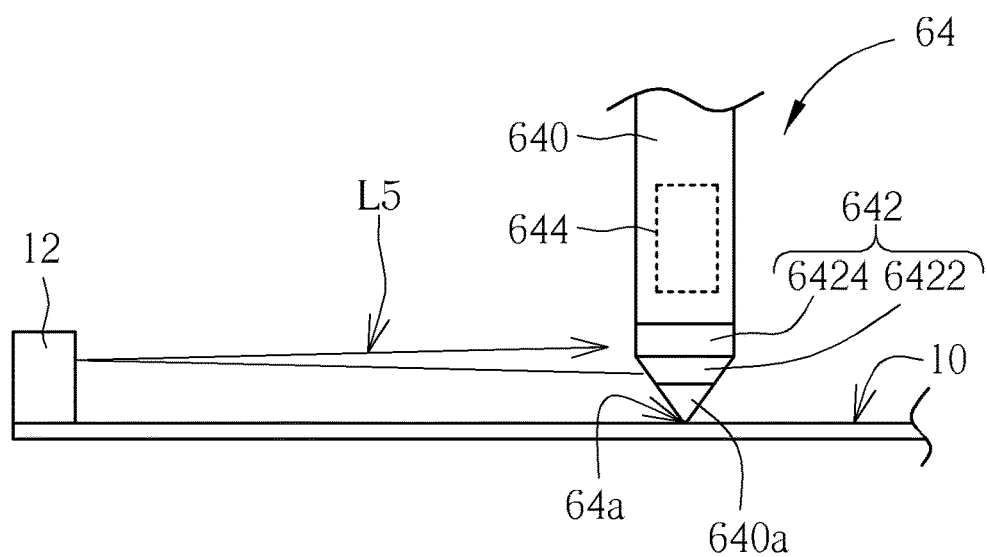
FIG. 15 is a side view of a touch-position generating device contacting the touch surface according to a fifth embodiment.
Figure 16:
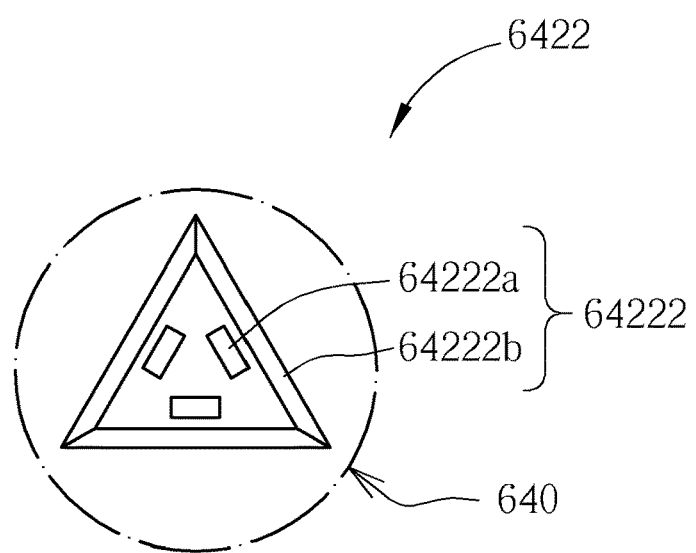
FIG. 16 is a schematic diagram illustrating the configuration of a lighting module of the touch-position generating device in FIG. 15 from a top view thereof.

Further, in the fifth embodiment, the lighting and receiving module 642 includes a lighting module 6422 and a receiving module 6424. The lighting module 6422 can emit light L5. After reflected by the reflective structure 12, the light L5 is received by the receiving module 6424. Please also refer to FIG. 16. FIG. 16 is a schematic diagram illustrating the configuration of the lighting module 6422 from a top view thereof; therein, the profile of the pen-like body 640 is indicated by a chain line. The lighting module 6422 includes a plurality of lighting units 64222, e.g. three lighting units 64222 in the fifth embodiment for simplification of the drawing. Each lighting unit 64222 includes a light source 64222*a* and a lens 64222*b*. The lens 64222*b* is disposed in front of the light source 64222*a* so as to modulate the light emitted by the light source 64222*a* into a linear light source. The lighting module 6422 as a whole can emit light toward all sides simultaneously under a configuration of the lighting units 64222 arranged in a ring. Similarly, the receiving module 6424 includes a plurality of image-capturing units arranged in a ring so as to form a circular image-capturing area (disposed around the pen-like body 640 of the touch-position generating device 64, as shown in FIG. 15) for receiving the light that is normally reflected by the reflective structure 12 relative to the touch surface 10. Therein, in practice, each image-capturing unit may include an optical sensor and a lens disposed in front of the optical sensor. The plurality of the image-capturing units are arranged in a ring as the configuration shown by FIG. 16, so that the receiving module 6424 as a whole can receive the light reflected from all sides.

In addition, the pen-like body 640 has a contact end 640a. The lighting units 64222 of the lighting module 6422 are located between the contact end 640a and the image-capturing units of the receiving module 6424. Therefore, from a view parallel to the touch surface 10, when reflected by the reflective structure 12, the light L5 substantially forms an included angle (i.e. the sum of the incident angle and the reflection angle of the light L5 projected on a plane vertical to the touch surface 10). The existence of the included angle makes the light, after reflected multiple times, not be received by the receiving module 6424, or is in cooperation with the reflective structure 12 disposed in a proper height so that the light reflected by the reflective structure 12, the pen-like body 640, or the receiving module 6424 will not be reflected by the reflective structure 12 again. It improves the determination of a touch position 64a (i.e. where the contact end 640a contacts the touch surface 10) of the touch-position generating device 64 on the touch surface 10 by the processing module 644. In another aspect, by designing the included angle (i.e. the sum of the incident angle and the reflection angle of the light L5) that is formed when the light L5 is reflected by the reflective structure 12, the lighting module 6422 and the receiving module 6424 still can function normally with the lighting module 6422 and the receiving module 6424 disposed separately from each other in a distance. It is added that the light L5 still can be regarded to be normally reflected relative to the touch surface 10 in logic, so the processing module 644 still can determine the distance between the touch-position generating device 64 and the reflective structure 12 according thereto.

Figure 17:
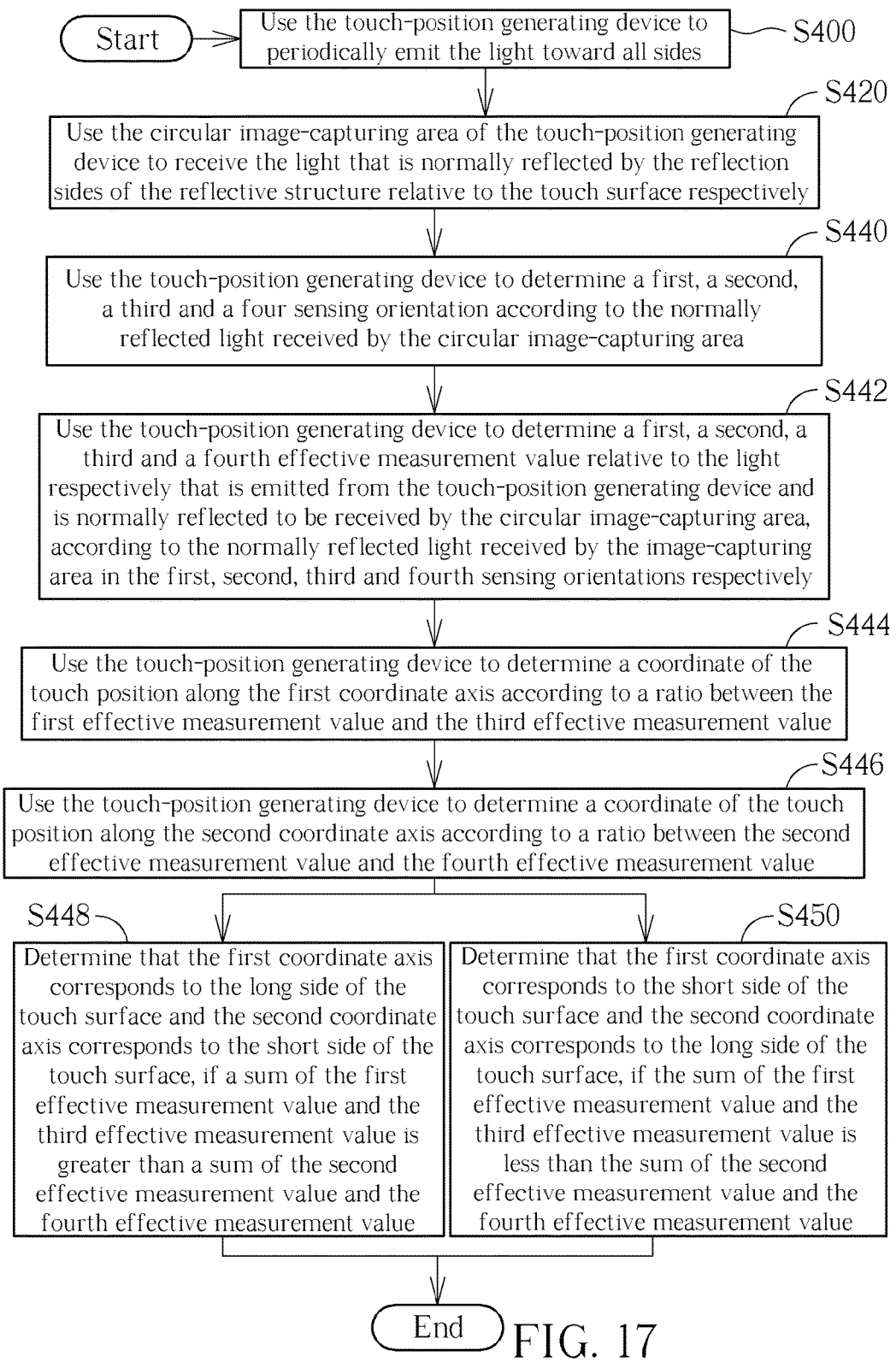
FIG. 17 is a flow chart of a method of a sixth embodiment according to the invention.
Figure 18:
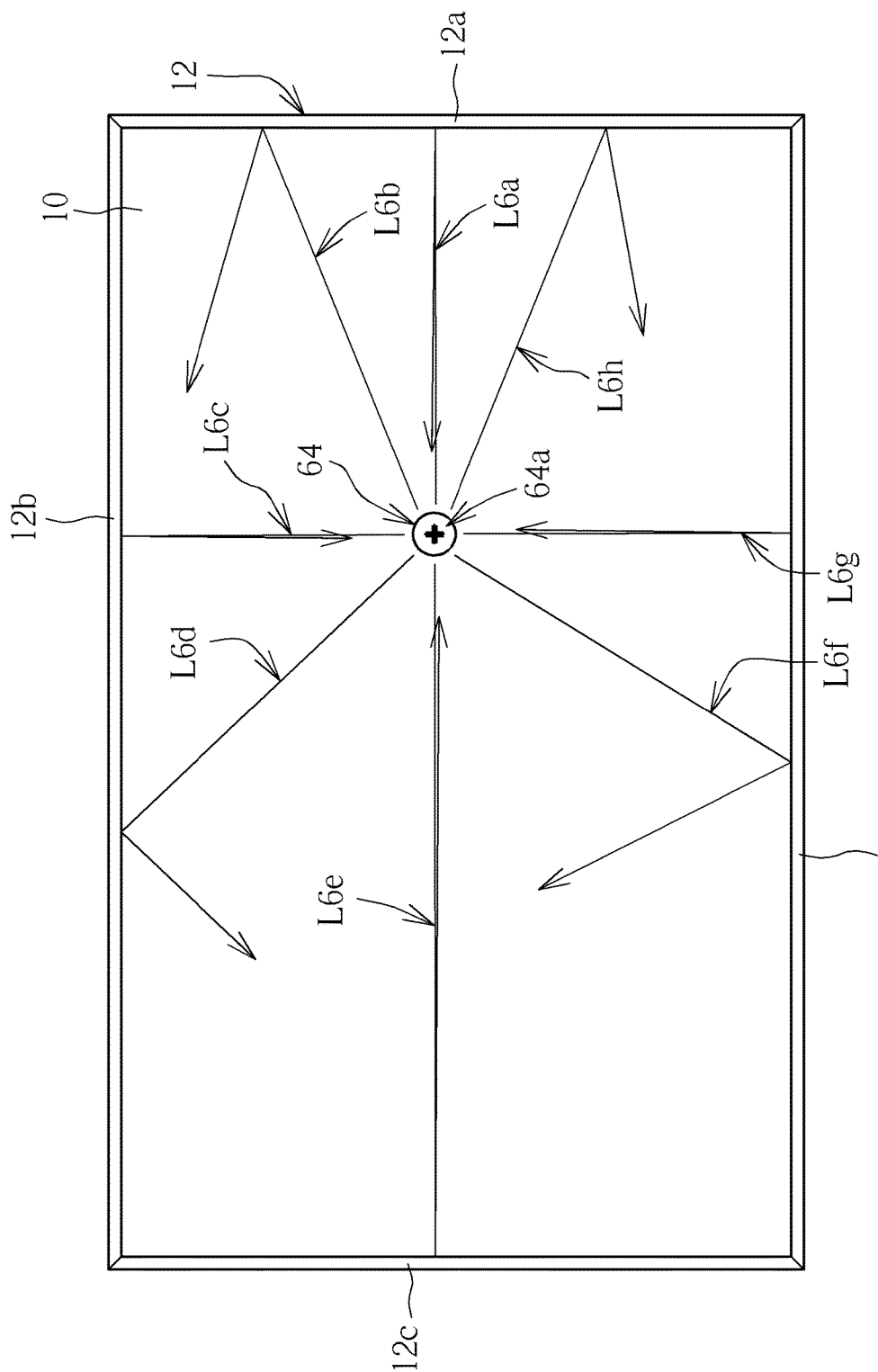
FIG. 18 is a schematic diagram illustrating the touch-position generating device in FIG. 15 from a top view in accordance with the method shown by FIG. 17.

Please also refer to FIG. 17 and FIG. 18. FIG. 17 is a flow chart of a method of a sixth embodiment according to the invention. The flow chart in FIG. 17 is applied to the touch-position generating device 64 and is still based on the flow chart in FIG. 2. FIG. 18 is a schematic diagram illustrating the touch-position generating device 64 in accordance with the method from a top view; therein, the touch-position generating device 64, shown by a circle, is used in cooperation with the reflective structure 12 and the touch surface 10, and a touch position 64a of the touch-position generating device 64 on the touch surface 10 is indicated by a cross mark. Corresponding to the step S100 in FIG. 2, in the sixth embodiment, the method of the invention is to use the touch-position generating device 64 to periodically emit the light (e.g. light L6a~h for a simple interpretation) toward all sides, as shown by the step S400 in FIG. 17. Because the lighting units 64222 of the lighting module 6422 are arranged in a ring, the lighting module 6422 as a whole can emit light toward all sides (or 360 degrees).

Corresponding to the step S120 in FIG. 2, in the sixth embodiment, the method of the invention is to use the circular image-capturing area (or the receiving module 6424) of the touch-position generating device 64 to receive the light L6a, L6c, L6e and L6g that is normally reflected by the reflection sides 12a~d of the reflective structure 12 relative to the touch surface 10 respectively, as shown by the step S420 in FIG. 17. Therein, because of not being normally reflected by the reflection sides 12a~d, the light L6b, L6d, L6f and L6h are not received by the receiving module 6424. Similarly, by the receiving module 6424 receiving the light L6a, L6c, L6e and L6g that is normally reflected by the reflection sides 12a~d of the reflective structure 12, the method of the invention can determine the distances from the touch-position generating device 64 to each of the reflection sides 12a~d.

Corresponding to the step S140 in FIG. 2, in the sixth embodiment, the method of the invention is to use the touch-position generating device 64 to determine a first, a second, a third and a four sensing orientation according to the normally reflected light L6a, L6c, L6e and L6g received by the circular image-capturing area (or the receiving module 6424), as shown by the step S440 in FIG. 17. Therein, in practice, because the circular image-capturing area receives light from all sides simultaneously, a distribution of image varying with time can be dynamically obtained through the circular image-capturing area. The dynamic distribution of image corresponds to receiving angles (i.e. an angle range of 360 degrees). In the dynamic distribution of image, the first, second, third and fourth sensing orientations correspond to the angles where the normally reflected light L6a, L6c, L6e and L6g is received; therein, the first sensing orientation is opposite to the third sensing orientation, and the second sensing orientation is opposite to the fourth sensing orientation. In the sixth embodiment, the method of the invention is to use the touch-position generating device 64 to determine a first, a second, a third and a fourth effective measurement value relative to the light L6a, L6c, L6e and L6g respectively that is emitted from the touch-position generating device 64 and is normally reflected to be received by the circular image-capturing area, according to the normally reflected light L6a, L6c, L6e and L6g received by the image-capturing area in the first, second, third and fourth sensing orientations respectively, as shown by the step S442 in FIG. 17. Afterwards, in the sixth embodiment, the method of the invention is to use the touch-position generating device 64 to determine a coordinate of the touch position 34a along the first coordinate axis C1 according to a ratio between the first effective measurement value and the third effective measurement value, as shown by the step S444 in FIG. 17; besides, the method is also to use the touch-position generating device 64 to determine a coordinate of the touch position 34a along the second coordinate axis C2 according to a ratio between the second effective measurement value and the fourth effective measurement value, as shown by the step S446 in FIG. 17. Thereby, the touch position 64a is determined by the coordinates corresponding to the first coordinate axis C1 and the second coordinate axis C2.

It is similar to the second and the third embodiment that in practice the first effective measurement value may correspond to the short of the touch surface 10 (while the light L6a is the light traveling the direction parallel to the short side of the touch surface 10), so in the sixth embodiment, the method of the invention still can determine the relationship of the first coordinate axis C1 and the second coordinate axis C2 with the long side and the short side of the touch surface 10 according to the relationship between the four effective measurement values. In the sixth embodiment, the method of the invention is to determine that the first coordinate axis C1 corresponds to the long side of the touch surface 10 and the second coordinate axis C2 corresponds to the short side of the touch surface 10, if a sum of the first effective measurement value and the third effective measurement value is greater than a sum of the second effective measurement value and the fourth effective measurement value, as shown by the step S448 in FIG. 17, and to determine that the first coordinate axis C1 corresponds to the short side of the touch surface 10 and the second coordinate axis C2 corresponds to the long side of the touch surface 10, if the sum of the first effective measurement value and the third effective measurement value is less than the sum of the second effective measurement value and the fourth effective measurement value, as shown by the step S450 in FIG. 17.

Furthermore, in the step S442, in practice, the four effective measurement values can be determined by checking measured values, produced by the lighting and receiving module 642, with a check value. In the sixth embodiment, the method of the invention defines two check values like the two check values in the abovementioned second embodiment. For the description of the two check values herein, please refer to the relevant description in the foregoing description, which will not be repeated in addition. Similarly, Based on the case shown by FIG. 18, the sum of the first effective measurement value and the third effective measurement value (corresponding to the light L6a and L6e respectively) is equal the check value corresponding to the long side of the touch surface 10, and the sum of the second effective measurement value and the fourth effective measurement value (corresponding to the light L6c and L6g respectively) is equal the check value corresponding to the short side of the touch surface 10.

In addition, it is added that in the above embodiments, the processing modules 144, 344, 544 and 644 of the touch-position generating devices 14, 34, 44, 54 and 64 are directly disposed in the pen-like bodies 140, 340, 540 and 640, so that each of the touch-position generating device 14, 34, 44, 54 and 64 is provided as a single pen-like device that independently operates to determine the touch position 34a, 44a or 64a; however, the invention is not limited thereto. In practice, the processing modules 144, 344, 544 and 644 also can be disposed in other place and connected in communication to the lighting and receiving modules 142, 342, 542 and 642 by a wire or wireless way. For example, the processing modules 144, 344, 544 or 644 is disposed on the external electronic apparatus (for example by being electrically slotted into an exposed connection port of the external electronic apparatus 21), or disposed in a screen body providing the touch surface 10 or inside the external electronic apparatus 21.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for determining a touch position of a touch-position generating device on a touch surface, a reflective structure being disposed to surround the touch surface, the touch surface being rectangular, the reflective structure comprising four reflection sides for reflecting light, the four reflection sides being correspondingly disposed at a circumference of the touch surface, the touch-position generating device comprising four rangefinders disposed toward all sides in a first, a second, a third and a fourth direction respectively, the first direction being opposite to the third direction, the second direction being opposite to the fourth direction, the method comprising the following steps of:
   (a) using the touch-position generating device to emit light toward the reflective structure by rotating the four rangefinders;
   (b) using the four rangefinders of the touch-position generating device to receive the light that is normally reflected by the reflective structure relative to the touch surface;
   (c21) according to the light that is normally reflected to be received by the four rangefinders, determining an effective measurement value for each rangefinder relative to the light is emitted from the rangefinder and is normally reflected to be received by the rangefinder;
   (c22) determining a coordinate of the touch position along a first coordinate axis according to a ratio between the two effective measurement values corresponding to the two rangefinders disposed in the first and third directions; and
   (c23) determining a coordinate of the touch position along a second coordinate axis according to a ratio between the two effective measurement values corresponding to the two rangefinders disposed in the second and fourth directions.

2. The method of claim 1, wherein the touch surface has a long side and a short side, and the method further comprises the following steps of:
   if a sum of the two effective measurement values corresponding to the two rangefinders disposed in the first and third directions is greater than a sum of the two effective measurement values corresponding to the two rangefinders disposed in the second and fourth directions, determining that the first coordinate axis corresponds to the long side and the second coordinate axis corresponds to the short side; and
   if the sum of the two effective measurement values corresponding to the two rangefinders disposed in the first and third directions is less than the sum of the two effective measurement values corresponding to the two rangefinders disposed in the second and fourth directions, determining that the first coordinate axis corresponds to the short side and the second coordinate axis corresponds to the long side.

3. The method of claim 1, wherein the method defines two check values, one of the two check values is determined based on a time the light takes to travel back and forth along a first side of the touch surface, the other one of the two check value is determined based on a time the light takes to travel back and forth along a second side of the touch surface, in the step (c21), a sum of the two effective measurement values corresponding to the two rangefinders disposed in the first and third directions is equal to one of the two check values, and a sum of the two effective measurement values corresponding to the two rangefinders disposed in the second and fourth directions is equal to the other one of the two check values.

4. A method for determining a touch position of a touch-position generating device on a touch surface, the touch surface being rectangular, a reflective structure comprising four reflection sides disposed to surround the touch surface, the four reflection sides being correspondingly disposed at a circumference of the touch surface, the touch-position generating device comprising a rangefinder and a circular image-capturing area disposed surrounding touch-position generating device, the method comprising the following steps of:

(a) using the touch-position generating device to emit light toward the reflective structure;

(b) using the circular image-capturing area of the touch-position generating device to receive the light that is normally reflected relative to the touch surface by the reflective structure;

(c31) according to the light that is normally reflected to be received by the circular image-capturing area, determining a first, a second, a third and a fourth sensing orientation, the first sensing orientation being opposite to the third sensing orientation, the second sensing orientation being opposite to the fourth sensing orientation;

(c32) according to the light that is normally reflected to be received by the circular image-capturing area, determining a first, a second, a third and a fourth effective measurement value relative to the light that is emitted from the rangefinder and is normally reflected to be received by the circular image-capturing area corresponding to the first, second, third and fourth sensing orientations;

(c33) determining a coordinate of the touch position along a first coordinate axis according to a ratio between the first effective measurement value and the third effective measurement value; and (c34) determining a coordinate of the touch position along a second coordinate axis according to a ratio between the second effective measurement value and the fourth effective measurement value.

5. The method of claim 4, wherein the touch surface has a long side and a short side, and the method further comprises the following steps of:

if a sum of the first effective measurement value and the third effective measurement value is greater than a sum of the second effective measurement value and the fourth effective measurement value, determining that the first coordinate axis corresponds to the long side and the second coordinate axis corresponds to the short side; and if a sum of the first effective measurement value and the third effective measurement value is less than a sum of the second effective measurement value and the fourth effective measurement value, determining that the first coordinate axis corresponds to the short side and the second coordinate axis corresponds to the long side.

6. The method of claim 4, wherein the method defines two check values, one of the two check values is determined based on a time the light takes to travel back and forth along a first side of the touch surface, the other one of the two check value is determined based on a time the light takes to travel back and forth along a second side of the touch surface, in the step (c32), a sum of the first effective measurement value and the third effective measurement value is equal to one of the two check values, and a sum of the second effective measurement value and the fourth effective measurement value is equal to the other one of the two check values.

7. A touch input system, comprising:
a touch surface;
a reflective structure disposed to surround the touch surface;
a touch-position generating device, comprising:
a pen-like body for performing a touch operation on the touch surface; and
a lighting and receiving module disposed on the pen-like body, the lighting and receiving module comprising a lighting module and a receiving module, the lighting module comprising a plurality of lighting units arranged in a circle so that the lighting module can emit light toward all sides toward the reflective structure simultaneously, the receiving module comprising a plurality of image-capturing units arranged in a circle to form a circular image-capturing area for receiving the light that is normally reflected by the reflective structure relative to the touch surface; and
a processing module connected in communication with the lighting and receiving module, the processing module being used for determining a touch position of the pen-like body on the touch surface according to the received light.

8. A touch-position generating device used for a touch input system, the touch input system comprising a touch surface and a reflective structure, the reflective structure being disposed to surround the touch surface, the touch-position generating device comprising:
a pen-like body for performing a touch operation on the touch surface;
a lighting and receiving module disposed on the pen-like body, the lighting and receiving module comprising a lighting module and a receiving module, the lighting module comprising a plurality of lighting units for emitting light toward the reflective structure, the plurality of the lighting units being arranged in a circle so that the lighting module can emit the light toward all sides simultaneously, the receiving module comprising a plurality of image-capturing units, the plurality of the image-capturing units are arranged in a circle to form a circular image-capturing area for receiving the light that is normally reflected by the reflective structure relative to the touch surface, the lighting and receiving module producing a plurality of measurement values according to the received light; and
a processing module disposed on the pen-like body and connected in communication with the lighting and receiving module, the processing module being used for determining a touch position of the pen-like body on the touch surface according to the plurality of the measurement values.

9. A touch-position generating device used for a touch input system, the touch input system comprising a touch surface and a reflective structure, the reflective structure being disposed to surround the touch surface, the touch-position generating device comprising:
a pen-like body for performing a touch operation on the touch surface;
a lighting and receiving module disposed on the pen-like body, the lighting and receiving module comprising at least one rangefinder, the at least one rangefinder being used for emitting light toward the reflective structure and receiving the light that is normally reflected by the reflective structure relative to the touch surface, the lighting and receiving module producing a plurality of measurement values according to the received light;
a processing module disposed on the pen-like body and connected in communication with the at least one rangefinder, the processing module being used for determining a touch position of the pen-like body on the touch surface according to the plurality of the measurement values; and
a rotation mechanism disposed in the pen-like body, wherein the at least one rangefinder is disposed on the rotation mechanism so that the at least one rangefinder can rotate relative to the pen-like body.

10. The touch-position generating device of claim 9, wherein the rotation mechanism comprises a rotation part and a driving module, the rotation part is rotatable around a rotation axis relative to the pen-like body, the driving module is engaged with the rotation part and drives the rotation part to rotate, and the at least one rangefinder is fixed on the rotation part.

11. The touch-position generating device of claim 10, wherein the pen-like body comprises a tube part and a rod part, the rod part is disposed in the tube part and is fixed relative to the tube part, the rod part has a contact end exposed out of the tube part, the rotation part is rotatably sleeved on the rod part, the driving module comprises a rotation sleeve, a rotation guiding structure, and an electromagnetism generation device, the rotation sleeve has a through hole, the rotation sleeve is sleeved on the rotation part by the through hole, a cross-sectional profile of the through hole matches with a cross-sectional profile of the rotation part such that the rotation part and the rotation sleeve can rotate together relative to the rod part and the rotation sleeve can slide on the rotation part along the rotation axis, the rotation guiding structure comprises a helical groove and a guiding post which are correspondingly disposed on an outer surface of the rotation sleeve and an inner sidewall surface of the tube part respectively, the guiding post can relatively slide in the helical groove, and the electromagnetism generation device is disposed on the pen-like body and can drive the rotation sleeve by a magnetic force to move along the rotation axis.

12. The touch-position generating device of claim 11, wherein the rotation sleeve can produce a permanent magnetic field, the electromagnetism generation device can produce an induced magnetic field, and the electromagnetism generation device can control the rotation sleeve to move forward and backward along the rotation axis by an interaction between the induced magnetic field and the permanent magnetic field.

13. The touch-position generating device of claim 10, wherein the pen-like body comprises a main portion and a contact portion, the contact portion is fixedly connected to the main portion and is exposed out of the main portion, the rotation part is rotatably disposed in the main portion and comprises an internal gear, the driving module comprises at least one motor disposed in the main portion, and each of the at least one motor has an external gear meshing with the internal gear to drive the rotation part to rotate relative to the main portion.

14. The touch-position generating device of claim 13, wherein the rotation part is substantially circular and comprises a flange, the main portion has an opening and a step structure formed at the opening, the contact portion protrudes out of the main portion from the opening, the pen-like body comprises a constraint part fitted in the step structure such that the constraint part and the step structure form a recess, and the flange is rotatably disposed in the recess.

* * * * *